(12) United States Patent
Tatsuno

(10) Patent No.: US 9,423,683 B2
(45) Date of Patent: Aug. 23, 2016

(54) IMAGE PROJECTION APPARATUS
(71) Applicant: Hibiki Tatsuno, Kawasaki (JP)
(72) Inventor: Hibiki Tatsuno, Kawasaki (JP)
(73) Assignee: RICOH COMPANY, LTD., Tokyo (JP)
( * ) Notice: Subject to any disclaimer, the term of this patent is extended or adjusted under 35 U.S.C. 154(b) by 0 days.
(21) Appl. No.: 14/540,372
(22) Filed: Nov. 13, 2014
(65) Prior Publication Data
US 2015/0138518 A1    May 21, 2015
(30) Foreign Application Priority Data
Nov. 19, 2013    (JP) .................................. 2013-239255

(51) Int. Cl.
    *G03B 21/28*    (2006.01)
    *G03B 21/20*    (2006.01)
    *G03B 21/14*    (2006.01)
(52) U.S. Cl.
    CPC .............. *G03B 21/28* (2013.01); *G03B 21/208* (2013.01); *G03B 21/2066* (2013.01); *G03B 21/145* (2013.01)
(58) Field of Classification Search
    CPC .... G03B 21/28; G03B 21/145; G03B 21/208; G03B 21/2066; G03B 21/2053; G03B 21/14; F21V 5/048; F21V 5/74; F21V 5/7441; G02B 17/08; G02B 17/208; H04N 9/315; H04N 9/3152
    See application file for complete search history.

(56) References Cited

U.S. PATENT DOCUMENTS 5,692,819 A * 12/1997 Mitsutake ................ F21V 5/048
    348/E5.137
5,749,642 A *  5/1998 Kimura ....................... F21V 7/09
    348/E9.027
7,342,724 B2 *  3/2008 Hirata .................. H04N 9/3105
    353/30
2004/0156117 A1 *  8/2004 Takaura ................ G02B 13/16
    359/651
2004/0184160 A1    9/2004 Nishina et al.
2005/0185288 A1    8/2005 Nishina et al.
2005/0195492 A1    9/2005 Nishina et al.
(Continued)

FOREIGN PATENT DOCUMENTS

JP    2008-165202 A  *  7/2008
JP    2008-225455    9/2008
(Continued)

OTHER PUBLICATIONS

U.S. Appl. No. 14/272,838, filed May 8, 2014.
(Continued)

*Primary Examiner* — Sultan Chowdhury
(74) *Attorney, Agent, or Firm* — Oblon, McClelland, Maier & Neustadt, L.L.P

(57) ABSTRACT

An image projection apparatus which enlarges and projects an image displayed on an image display element as a projection image on a screen, comprising the image display element displaying an image, a refracting optical system including a free-curved lens; a reflecting optical system including at least one concave mirror, and a light-blocking member including an aperture. On a sectional surface of a total light flux being introduced into the refracting optical system and is imaged on the screen after the concave mirror, when a direction A corresponds to a long side and a direction B corresponds to a short side of the projection image, the light-blocking member includes the aperture between a position in which a diameter of the total light flux in the direction A is the smallest and a position, those in the direction B is the smallest.

11 Claims, 22 Drawing Sheets

(56) References Cited

U.S. PATENT DOCUMENTS

| | | |
|---|---|---|
| 2005/0195493 A1 | 9/2005 | Nishina et al. |
| 2006/0221309 A1* | 10/2006 | Onishi .................. G03B 21/10 353/97 |
| 2007/0216877 A1* | 9/2007 | Sacre ..................... G03B 21/10 353/97 |
| 2008/0079915 A1* | 4/2008 | Amano ................. G03B 21/10 353/98 |
| 2008/0192336 A1 | 8/2008 | Ohzawa |
| 2011/0026111 A1* | 2/2011 | Nagatoshi .............. G02B 17/08 359/364 |
| 2011/0310352 A1* | 12/2011 | Nakano ................ G03B 21/208 353/20 |
| 2012/0154768 A1 | 6/2012 | Tatsuno |
| 2012/0162753 A1 | 6/2012 | Tatsuno |
| 2013/0070217 A1 | 3/2013 | Tatsuno |
| 2013/0107232 A1 | 5/2013 | Tatsuno |
| 2013/0107233 A1 | 5/2013 | Hirakawa et al. |
| 2013/0107234 A1 | 5/2013 | Nishina et al. |
| 2013/0114053 A1 | 5/2013 | Tatsuno et al. |
| 2014/0118818 A1 | 5/2014 | Nishina et al. |
| 2014/0126045 A1 | 5/2014 | Tatsuno et al. |
| 2014/0146295 A1 | 5/2014 | Tatsuno |

FOREIGN PATENT DOCUMENTS

| | | |
|---|---|---|
| JP | 2008-242025 | 10/2008 |
| JP | 2008-242028 | 10/2008 |
| JP | 2010-72374 | 4/2010 |
| JP | 2011-33738 | 2/2011 |
| JP | 2011-33738 A * | 2/2011 |
| JP | 2011-150029 | 8/2011 |
| JP | 2011-150029 A * | 8/2011 |
| JP | 2011-150030 | 8/2011 |
| JP | 2011-150030 A * | 8/2011 |
| JP | 2012-141637 | 7/2012 |

OTHER PUBLICATIONS

U.S. Appl. No. 14/337,522, filed Jul. 22, 2014.
U.S. Appl. No. 14/249,962, filed Apr. 10, 2014.

* cited by examiner

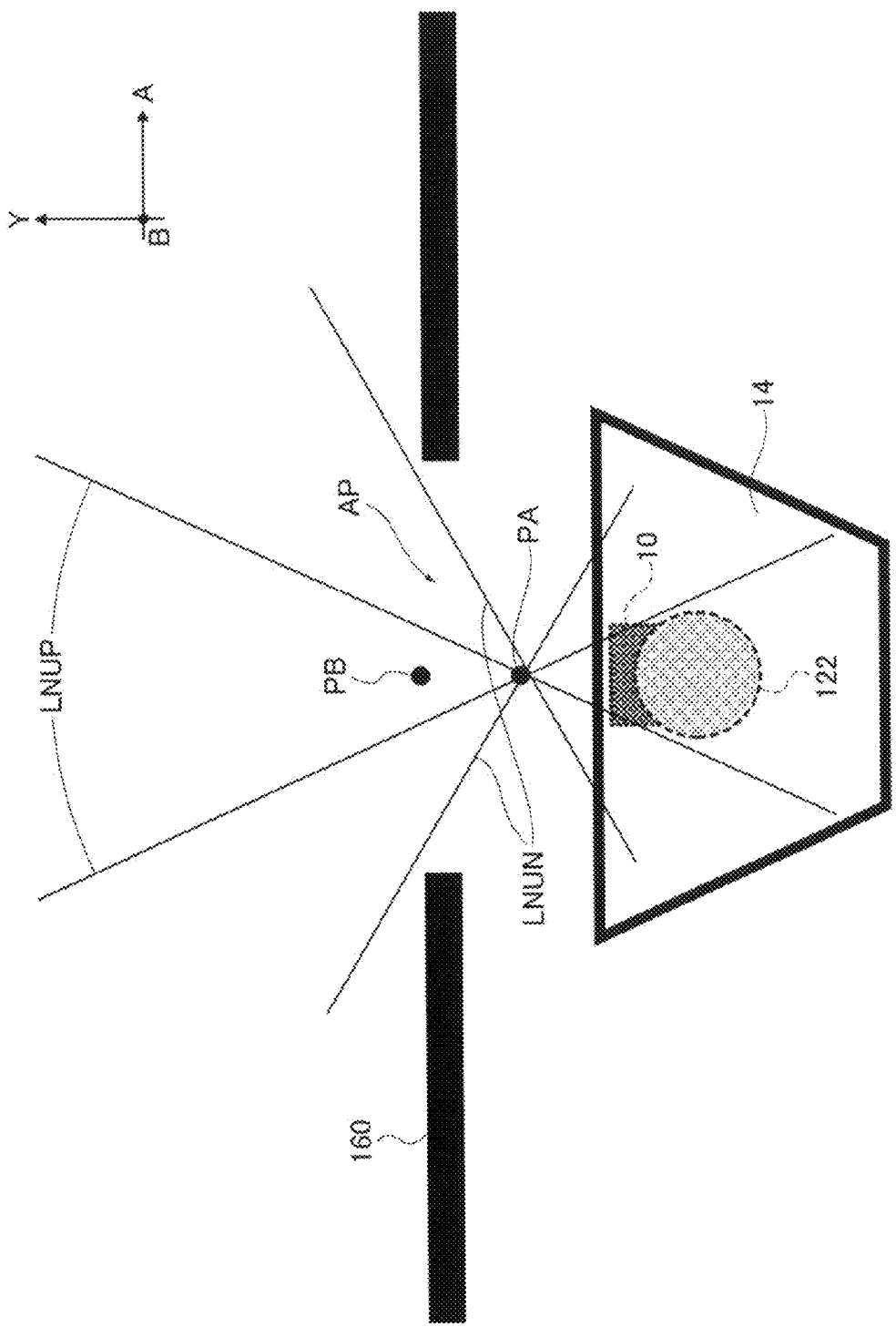

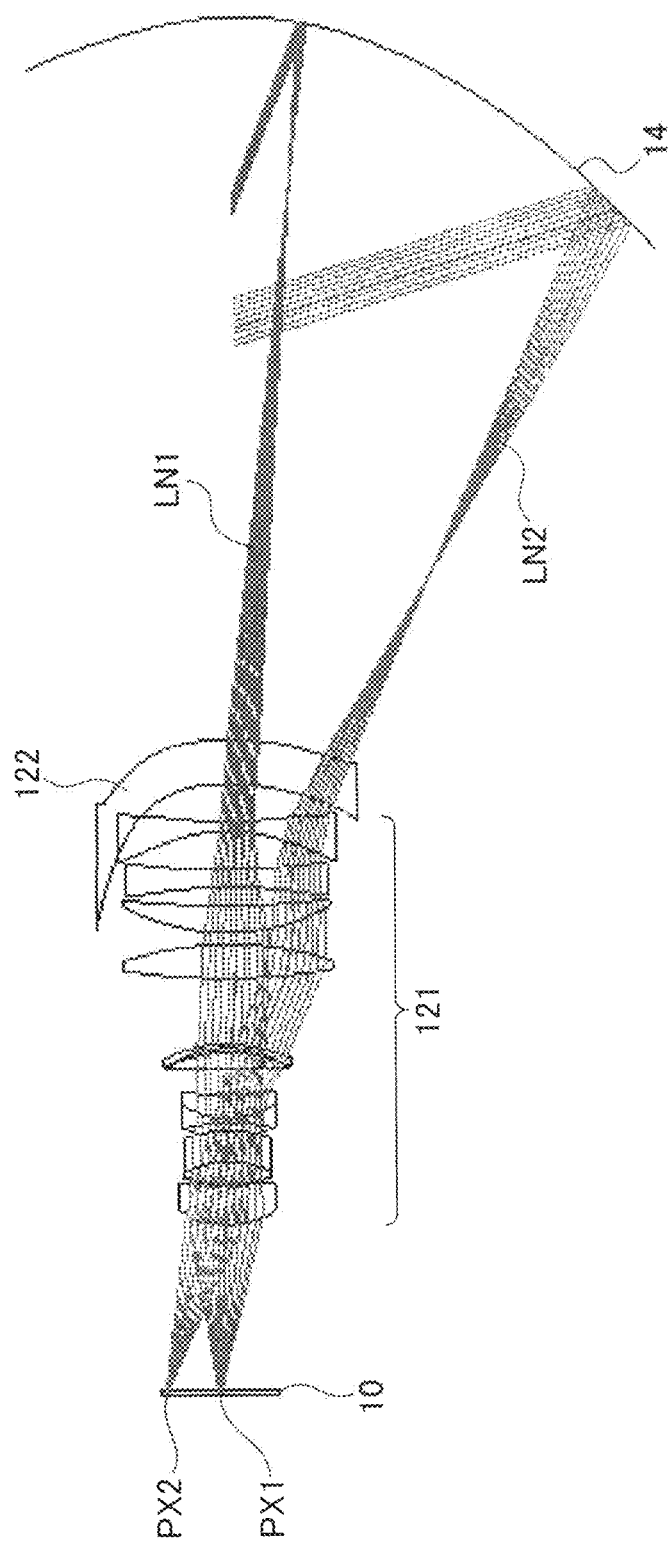

FIG.12

■EMBODIMENT 1

| SURFACE NUMBER | CURVATURE RADIUS | INTERVAL | REFRACTIVE INDEX (d LINE) ABBE NUMBER | APERTURE RADIUS | ECCENTRICITY Y (FROM PIXEL CLOSEST TO OPTICAL AXIS) | ECCENTRICITY α (SECTIONAL SURFACE Y) | ASPHERIC SURFACE | FREE-CURVED SURFACE |
|---|---|---|---|---|---|---|---|---|
| IMAGE DISPLAY ELEMENT (0) | 1.0E+18 | 1.000 | | | 0 | 0 | | |
| 1 | 1.0E+18 | 1.000 | 1.5168 64.2 | | 0 | 0 | | |
| 2 | 1.0E+18 | 29.000 | | | 0 | 0 | | |
| 3 | 13.980 | 6.931 | 1.4875 70.4 | | -1.380 | 0 | ● | |
| 4 | 205.219 | 0.249 | | | -1.380 | 0 | ● | |
| 5 | 2.5E-01 | 3.792 | 1.4875 70.4 | | -1.380 | 0 | | |
| 6 | -14.648 | 5.500 | 1.7543 28.4 | | -1.380 | 0 | | |
| 7 | -19.614 | 0.000 | | | -1.380 | 0 | | |
| APERTURE STOP | 0.000 | 1.409 | | 5.2 | -1.380 | 0 | | |
| 8 | -28.308 | 0.818 | 1.7445 43.6 | | -1.380 | 0 | | |
| 9 | 12.213 | 4.089 | 1.5426 48.7 | | -1.380 | 0 | | |
| 10 | 35.675 | 4.483 | | | -1.380 | 0 | | |
| 11 | 561.926 | 2.971 | 1.4875 70.4 | | -1.380 | 0 | | |
| 12 | -20.130 | 0.771 | | | -1.380 | 0 | | |
| 13 | -15.891 | 0.644 | 1.7486 35.5 | | -1.380 | 0 | | |
| 14 | -21.807 | 11.647 | | | -1.380 | 0 | | |
| 15 | 95.801 | 5.903 | 1.7485 27.8 | | -1.380 | 0 | | |
| 16 | -50.080 | 2.090 | | | -1.380 | 0 | | |
| 17 | 31.363 | 4.753 | 1.5329 51.2 | | -1.380 | 0 | | |
| 18 | 130.149 | 3.236 | | | -1.380 | 0 | | |
| 19 | -76.660 | 3.117 | 1.8467 23.7 | | -1.380 | 0 | | |
| 20 | 110.459 | 6.705 | | | -1.380 | 0 | ● | |
| 21 | -23.876 | 1.734 | 1.5305 55.8 | | -1.380 | 0 | ● | |
| 22 | 55.976 | 6.653 | | | -1.380 | 0 | | |
| 23 | 1.0E+18 | 7.755 | 1.5305 55.8 | | -1.380 | 0 | | ● |
| 24 | 1.0E+18 | 125.396 | | | -1.380 | 0 | | ● |
| CONCAVE MIRROR | | | | | 13.470 | 14.14 | | ● |
| SCREEN | 1.0E+18 | -463.000 | | | | 0 | | |

FIG.13

| SURFACE NUMBER | 3 | 4 | 21 | 22 |
|---|---|---|---|---|
| CONIC CONSTANT (K) | 7.15504E-01 | 7.53001E+02 | -1.27544E+00 | 1.03375E+00 |
| QUADRUPLICATE COEFFICIENT (A) | -1.20987E-05 | 9.62662E-05 | -3.36325E-07 | -2.23084E-05 |
| SEXTUPLICATE COEFFICIENT (B) | -1.40869E-08 | 3.26201E-07 | 1.84619E-08 | 2.08974E-08 |
| COEFFICIENT OF EIGHTH ORDER (C) | 9.99091E-10 | 9.68720E-09 | 4.21793E-11 | -2.79938E-11 |
| COEFFICIENT OF TENTH ORDER (D) | | | -3.88090E-14 | 1.19489E-14 |

$$D = \frac{C \cdot H^2}{1+\sqrt{1-(1+K)\cdot C^2 \cdot H^2}} + E_4 \cdot H^4 + E_6 \cdot H^6 + E_8 \cdot H^8 + E_{10} \cdot H^{10} + \cdots$$

FIG.14

| | SURFACE NUMBER: 23 | SURFACE NUMBER: 24 | SURFACE NUMBER: 25 |
|---|---|---|---|
| C | 0 | 0 | 0 |
| K:CONIC CONSTANT | 0 | 0 | 0 |
| C2:y | 0 | 0 | 0 |
| C3:X**2 | -0.01319775 | -0.010939347 | -0.009465536 |
| C4:Y**2 | -0.015177876 | -0.01252892 | -0.006590118 |
| C5:X**2 * Y | -0.000112155 | -0.000139522 | 4.04567E-05 |
| C6:Y**3 | -0.000336294 | -0.00025813 | 0.000112632 |
| C7:X**4 | -7.0931E-06 | -9.8379E-06 | 6.2536E-07 |
| C8:X**2 * Y**2 | -5.43722E-05 | -4.36682E-05 | -2.07001E-06 |
| C9:Y**4 | -4.03873E-05 | -2.52102E-05 | -1.07485E-06 |
| C10:X**4 * Y | -1.17272E-06 | -7.14904E-07 | 2.38606E-09 |
| C11:X**2 * Y**3 | -6.06982E-06 | -2.638E-06 | -8.09969E-08 |
| C12:Y**5 | -1.55043E-06 | -4.49324E-07 | -6.54439E-08 |
| C13:X**6 | 3.73136E-08 | 3.09328E-08 | -1.89158E-10 |
| C14:X**4 * Y**2 | 2.8433E-08 | -2.52167E-08 | 1.20445E-09 |
| C15:X**2 * Y**4 | -2.7693E-07 | -7.0645E-08 | 5.62766E-10 |
| C16:Y**6 | 2.82638E-08 | 9.19236E-09 | -5.53655E-10 |
| C17:X**6 * Y | 2.86785E-09 | 9.90403E-10 | 4.0566E-12 |
| C18:X**4 * Y**3 | 1.33762E-08 | -6.73672E-09 | 5.6036E-11 |
| C19:X**2 * Y**5 | 2.63401E-09 | -5.3939E-10 | 3.6327E-11 |
| C20:Y**7 | 1.66079E-09 | -7.11118E-10 | 5.95226E-12 |
| C21:X**8 | 6.57362E-11 | 1.22208E-11 | 2.70373E-14 |
| C22:X**6 * Y**2 | 1.14242E-10 | 9.35947E-11 | -8.5766E-14 |
| C23:X**4 * Y**4 | 7.12218E-10 | -7.03594E-10 | 2.23156E-13 |
| C24:X**2 * Y**6 | 4.74778E-10 | 1.06523E-11 | -2.28349E-13 |
| C25:Y**8 | -8.99161E-11 | -9.01405E-12 | 3.08668E-14 |
| C26:X**8 * Y | -9.22911E-12 | -2.04713E-12 | -1.25502E-15 |
| C27:X**6 * Y**3 | 5.16236E-12 | 8.26856E-12 | -9.95305E-15 |
| C28:X**4 * Y**5 | 2.02157E-11 | -3.15325E-11 | -1.35025E-14 |
| C29:X**2 * Y**7 | 1.8784E-11 | 1.86813E-12 | -1.34489E-14 |
| C30:Y**9 | -4.54956E-12 | 1.49691E-12 | -1.43476E-15 |
| C31:X**10 | -3.06925E-13 | -1.5908E-14 | -3.09305E-18 |
| C32:X**8 * Y**2 | -8.65681E-13 | -9.61882E-14 | -3.31522E-17 |
| C33:X**6 * Y**4 | -3.07083E-13 | 2.80486E-13 | -1.14536E-16 |
| C34:X**4 * Y**6 | 1.61843E-13 | -4.36879E-13 | -1.38227E-16 |
| C35:X**2 * Y**8 | -1.45827E-14 | 5.80786E-14 | -9.7976E-17 |
| C36:Y**10 | -8.218701E-14 | 4.163183E-14 | -1.291509E-17 |

FIG.15

$$z = \frac{cr^2}{1 + \text{SQRT}[1-(1+k)c^2r^2]} + \sum_{j=2}^{72} C_j x^m y^n$$

HEREIN:

z  SAGGING QUANTITY OF SURFACE WHICH IS PERPENDICULAR TO Z AXIS c  APEX CURVATURE (CUY)

k  CONIC CONSTANT

Cj  COEFFICIENT OF MONOMIAL $x^m y^n$ (EXPRESSION OF FREE-CURVED SURFACE)

SYMBOL ** REPRESENTS "EXPONENTIATION"
  FOR EXAMPLE, X**2 REPRESENTS "SQUARE OF X"

SYMBOL * REPRESENTS "MULTIPLY"
FOR EXAMPLE, X**4*Y**6 REPRESENTS
  "MULTIPLY SQUARE OF X BY SEXTUPLICATE OF Y"

FIG.16

| | FOCUS DISTANCE |
|---|---|
| L1 | 30.1 |
| L2 | 25.9 |
| L3/4 | -16.5 |
| L5/6 | 39.8 |
| L7 | -81.6 |
| L8 | 44.4 |
| L9 | 75.9 |
| L10 | -52.6 |
| L11 | -31.2 |
| FREE-CURVED SURFACE L | fX=-750, fY=-677 |

FIG.18

■EMBODIMENT 2

| SURFACE NUMBER | CURVATURE RADIUS | INTERVAL | REFRACTIVE INDEX (d LINE) | ABBE NUMBER | APERTURE RADIUS | ECCENTRICITY (FROM PIXEL CLOSEST TO OPTICAL AXIS) | ECCENTRICITY Y (SECTIONAL SURFACE Y) | ECCENTRICITY α | ASPHERIC SURFACE | FREE-CURVED SURFACE |
|---|---|---|---|---|---|---|---|---|---|---|
| IMAGE DISPLAY ELEMENT (0) | 1.0E+18 | 1.000 | | | | | 0 | 0 | | |
| 1 | 1.0E+18 | 1.000 | 1.5168 | 64.2 | | | 0 | 0 | | |
| 2 | 1.0E+18 | 29.000 | | | | | 0 | 0 | | |
| 3 | 18.335 | 13.075 | 1.4875 | 70.2 | 7.2 | | | | | |
| 4 | -43.460 | 0.100 | | | | | | | | |
| 5 | 3.1E+01 | 3.756 | 1.4875 | 70.2 | | | | | | |
| 6 | -17.930 | 0.000 | | | | | | | | |
| 7 | -17.930 | 0.750 | 1.9108 | 35.2 | | | | | | |
| 8 | 1596.527 | 0.100 | | | | | | | | |
| 9 | 26.366 | 8.903 | 1.6544 | 34.4 | 6.2 | | | | | |
| 10 | -19.033 | 0.750 | 1.9103 | 35.1 | | | -1.510 | | | |
| 11 | 15.569 | 16.000 | 1.6045 | 37.1 | | | -1.510 | | | |
| 12 | 47.687 | 2.000 | | | | | -1.510 | | | |
| 13 | -97.026 | 4.895 | 1.4970 | 81.6 | | | -1.510 | | | |
| 14 | -27.157 | 4.617 | | | | | -1.510 | | | |
| 15 | -14.890 | 1.193 | 1.8467 | 23.7 | | | -1.510 | | | |
| 16 | -17.421 | 2.420 | | | | | -1.510 | | | |
| 17 | 96.479 | 9.294 | 1.8081 | 26.2 | | | -1.510 | | | |
| 18 | -61.451 | 3.648 | | | | | -1.510 | | | |
| 19 | 33.795 | 10.918 | 1.5727 | 65.0 | | | -1.510 | | | |
| 20 | 451.700 | 0.750 | 1.8467 | 23.7 | | | -1.510 | | | |
| 21 | -62.783 | 6.280 | | | | | -1.510 | | | |
| 22 | 141.939 | 6.308 | 1.5305 | 55.8 | | | -1.510 | | | |
| 23 | -29.640 | 5.667 | 1.5305 | 55.8 | | | -1.510 | | | |
| 24 | 3.4E+01 | 10.731 | | | | | -1.510 | | ● | |
| 25 | 1.0E+18 | 12.610 | | | | | -1.510 | | ● | |
| 26 | 1.0E+18 | -314.93 | | | | | | | | |

REFLECTING SURFACE CONDITION AND POSITION OF STANDARD POINT OF SCREEN WHEN APEX OF THE TWENTY SIXTH SURFACE IN LENS DATA IS PROVIDED AS STANDARD POINT

| SURFACE NUMBER | X | Y | OPTICAL AXIS DIRECTION | ECCENTRICITY α | ASPHERIC SURFACE | FREE-CURVED SURFACE |
|---|---|---|---|---|---|---|
| 27 PLANE MIRROR | 0.00 | 0.00 | 72.68 | -45.00 | | |
| 28 CONCAVE MIRROR | 0.00 | 79.28 | 83.03 | -107.68 | | ● |
| 29 SCREEN | 0.00 | -314.93 | 75.68 | -90.00 | | |

FIG.19

| SURFACE NUMBER | 21 | 22 |
|---|---|---|
| CONIC CONSTANT (K) | -1.86009E+00 | 4.19548E-01 |
| QUADRUPLICATE COEFFICIENT (A) | 1.35071E-05 | -2.05678E-05 |
| SEXTUPLICATE COEFFICIENT (B) | -5.66452E-09 | 1.99337E-08 |
| COEFFICIENT OF EIGHTH ORDER (C) | 1.15469E-11 | -2.51929E-11 |
| COEFFICIENT OF TENTH ORDER (D) | -4.97859E-15 | 6.52829E-15 |

FIG.20

| | SURFACE NUMBER 25 | SURFACE NUMBER 26 | SURFACE NUMBER 28 |
|---|---|---|---|
| C | 0 | 0 | 0 |
| K: CONIC CONSTANT | 0 | 0 | 0 |
| C2: y | 0 | 0 | 0 |
| C3: $X^{**}2$ | -0.013924891 | -0.018272048 | 0.009971888 |
| C4: $Y^{**}2$ | -0.014353803 | -0.019066835 | 0.010466419 |
| C5: $X^{**}2 * Y$ | -0.000277046 | -0.000195552 | -9.37005E-05 |
| C6: $Y^{**}3$ | -0.000451699 | -0.000357179 | -9.18466E-05 |
| C7: $X^{**}4$ | 5.56254E-06 | -3.26895E-06 | -7.68559E-07 |
| C8: $X^{**}2 * Y^{**}2$ | -4.38249E-05 | -3.00711E-05 | 1.46412E-06 |
| C9: $Y^{**}4$ | -3.81877E-05 | -2.23662E-05 | 9.41859E-07 |
| C10: $X^{**}4 * Y$ | -7.5574E-07 | -5.61994E-07 | 9.69992E-09 |
| C11: $X^{**}2 * Y^{**}3$ | -6.77004E-06 | -2.52229E-06 | 9.10013E-08 |
| C12: $Y^{**}5$ | -1.6727E-06 | -4.05434E-07 | 6.43304E-08 |
| C13: $X^{**}6$ | 2.92697E-08 | 2.97701E-08 | 1.88803E-10 |
| C14: $X^{**}4 * Y^{**}2$ | 4.88905E-08 | -1.06838E-08 | -1.30247E-09 |
| C15: $X^{**}2 * Y^{**}4$ | -2.79602E-07 | -5.77145E-08 | -5.87126E-10 |
| C16: $Y^{**}6$ | 3.03603E-08 | 8.52511E-09 | 5.77681E-10 |
| C17: $X^{**}6 * Y$ | 6.4737E-09 | 1.82788E-09 | -5.59456E-12 |
| C18: $X^{**}4 * Y^{**}3$ | 1.41066E-08 | -6.18946E-09 | -5.8711E-11 |
| C19: $X^{**}2 * Y^{**}5$ | 2.6777E-09 | -8.07075E-10 | -3.74059E-11 |
| C20: $Y^{**}7$ | 1.73199E-09 | -7.78326E-10 | -5.964E-12 |
| C21: $X^{**}8$ | -9.41432E-11 | -5.05186E-11 | -3.08456E-14 |
| C22: $X^{**}6 * Y^{**}2$ | 3.06184E-10 | 6.92858E-11 | 9.87637E-14 |
| C23: $X^{**}4 * Y^{**}4$ | 6.91443E-10 | -6.79647E-10 | -1.65917E-13 |
| C24: $X^{**}2 * Y^{**}6$ | 5.21892E-10 | 2.16954E-11 | 2.44303E-13 |
| C25: $Y^{**}8$ | -8.98704E-11 | -2.98604E-12 | -3.27996E-14 |
| C26: $X^{**}8 * Y$ | -9.3564E-12 | -1.06961E-12 | 1.09125E-15 |
| C27: $X^{**}6 * Y^{**}3$ | 7.862E-12 | 6.39681E-12 | 9.09203E-15 |
| C28: $X^{**}4 * Y^{**}5$ | 1.76862E-11 | -3.02029E-11 | 1.32604E-14 |
| C29: $X^{**}2 * Y^{**}7$ | 1.65012E-11 | 1.41965E-12 | 1.32719E-14 |
| C30: $Y^{**}9$ | -4.61765E-12 | 1.54054E-12 | 1.46794E-15 |
| C31: $X^{**}10$ | 9.54497E-14 | 5.13994E-14 | 2.98217E-18 |
| C32: $X^{**}8 * Y^{**}2$ | -3.71117E-13 | 5.01121E-14 | 2.40384E-17 |
| C33: $X^{**}6 * Y^{**}4$ | 4.03991E-13 | 2.6832E-13 | 9.26365E-17 |
| C34: $X^{**}4 * Y^{**}6$ | 1.48661E-13 | -4.91619E-13 | 1.23324E-16 |
| C35: $X^{**}2 * Y^{**}8$ | 1.9073E-13 | 4.62047E-14 | 9.30252E-17 |
| C36: $Y^{**}10$ | -5.516680E-14 | 3.254755E-14 | 1.307179E-17 |

FIG.21

| | FOCUS DISTANCE (mm) |
|---|---|
| L1 | 27.8 |
| L2 | 21.8 |
| L3 | -15.2 |
| L456 | -143.6 |
| L7 | 69.9 |
| L8 | -103.8 |
| L9 | 42.7 |
| L10 | 70.1 |
| L11 | -58.2 |
| L12 | -28.9 |
| FREE-CURVED SURFACE L | fX=154, fY=142 |

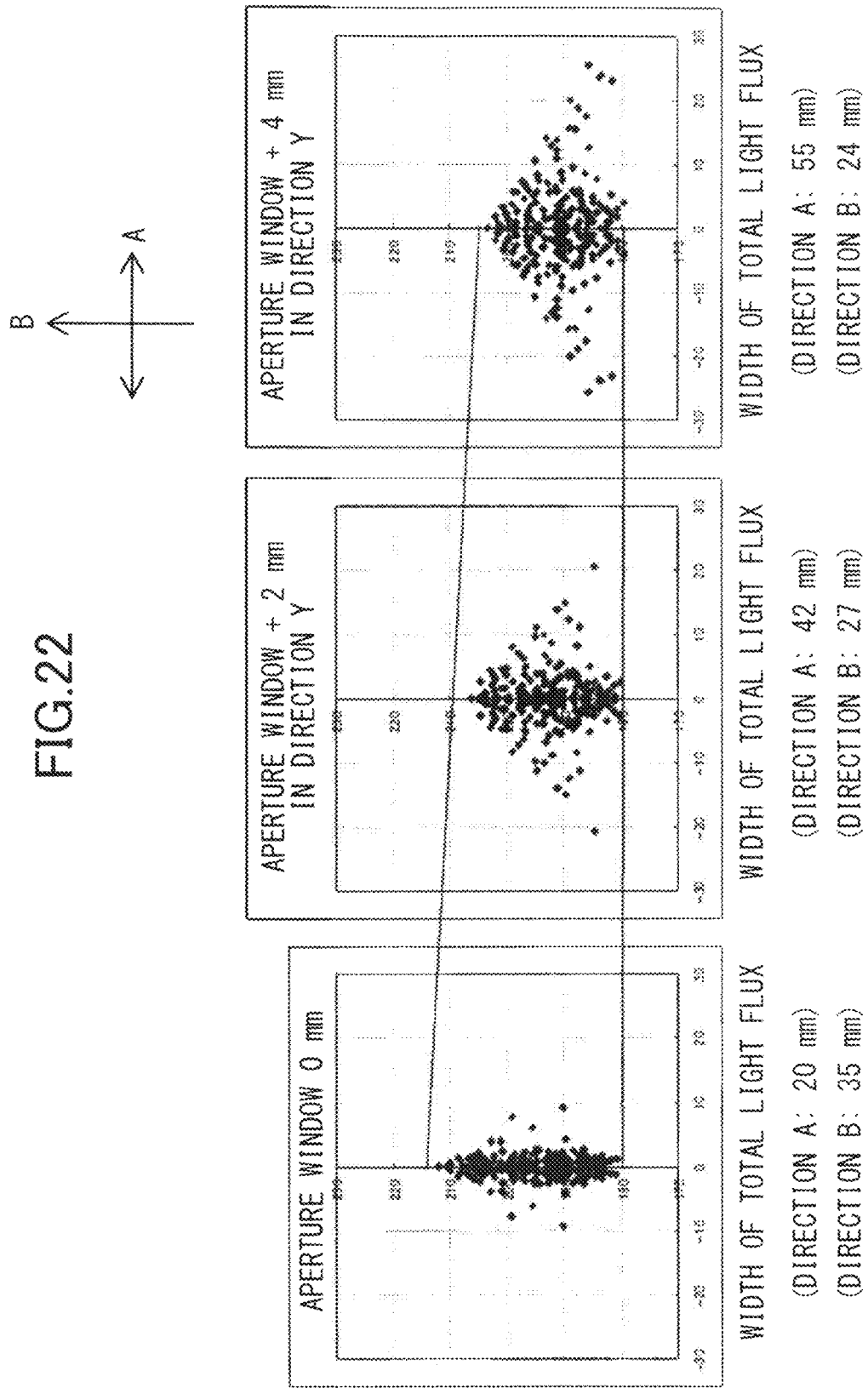

IMAGE PROJECTION APPARATUS

CROSS-REFERENCE TO RELATED APPLICATION

The present application is based on and claims priority from Japanese Patent Application No. 2013-239255, filed on Nov. 19, 2013, the disclosure of which is hereby incorporated by reference herein in its entirety.

BACKGROUND

1. Field of the Invention

The present invention relates to an image projection apparatus.

The image projection apparatus is used as a projector.

2. Description of the Related Art

In recent years, use of projectors has been widely spread.

Particularly, a short throw projector, which forms an image with a light flux emitted from an image display element on a screen through a refracting optical system and a concave mirror, has become highly popular.

In such a projector, an optical system including the refracting optical system and the concave mirror to form a projection image is a so-called projection optical system.

The above-described type of the projection optical system in the projector is generally made of the combination of a refracting optical system including a plurality of lenses which have an optical axis in common and a concave mirror having an aspheric surface or a free-curved surface.

Recently, a method to employ the free-curved lens in the refracting optical system in the projection optical system has been proposed (refer to Japanese Patent laid-open application publications Nos. 2008-225455, 2008-242025, 2008-242028, 2011-033738, 2011-150029, and 2011-150030).

When the free-curved lens is employed in the refracting optical system, a direction of a light beam can be controlled minutely by the optical function according to the position of the surface of the free-curved lens.

Therefore, distortion in a projection image can be reduced by employing the free-curved lens, the entire projection optical system can be downsized, and at the same time improved image quality can be achieved.

However, on the other hand, such a case includes the following problems.

That is, the projection optical system in which the free-curved lens is assembled properly as designed can validly realize the above-described effect; however, if it includes an assembly error, the function of forming a projection image is deteriorated significantly.

Therefore, the effect of the free-curved lens cannot be realized even if assembly error is only a slight because the lens surface is formed to be a free-curved surface.

In light of the above, assembly error causes significant deterioration in the image quality of the projection image.

One option to solve the above-described problem is to configure the free-curved lens to condense light weakly. Thus, the function of the free-curved lens is mainly employed for minute control to correct a distortion or a field curvature.

When the free-curved lens is configured to condense light weakly and is formed to have a refractive-angle difference between the incident light beam toward the free-curved lens and the emission light beam from the free-curved lens is small, the deterioration in the function of the free-curved lens caused by assembly error can be suppressed.

Thereby, the image degradation caused by assembly error of the free-curved lens can be reduced.

However, when the free-curved lens is configured to condense light weakly, the thickness of the lens is reduced. Consequently, an influence on the image caused by ghost light is apt to appear.

That is, when the light beam emitted from the image display element enters the free-curved lens and is emitted from the lens surface of the emission side, a part of the light beam reflects on the lens surface of the emission side.

The reflected light beam goes back to the lens surface of the incident side and reflects on the lens surface, and then the light beam is emitted from the lens surface of the emission side as ghost light in relation to a regular light beam.

Because the free-curved lens is configured to have a small refractive-angle difference between the incident light beam and the emission light beam, the optical path of the light beam which is to be the ghost light extends adjacent to the optical path of the regular light beam.

Thus, a ghost image is generated on the projection image.

The above-described related arts which propose projectors using the free-curved lens do not disclose or suggest a solution for such an influence caused by the ghost light.

SUMMARY

The present invention has been made in order to realize an image projection apparatus which is capable of dealing with problems caused by the above-described ghost light which is generated through the free-curved lens.

An image projection apparatus which enlarges and projects an image displayed on an image display element as a projection image on a screen comprising: the image display element which displays an image to be enlarged and projected; a refracting optical system which includes a free-curved lens; a reflecting optical system which includes at least one concave mirror; and a light-blocking member which includes an aperture, wherein on a sectional surface of a total light flux, which is a bunch of whole light beams which is introduced into the refracting optical system from the image display element, and is imaged on the screen, after the concave mirror, when a direction corresponding to a long side direction of the projection image is a direction A and a direction corresponding to a short side direction of the projection image is a direction B, the light-blocking member is disposed so that the aperture locates in between a position in which a diameter of the total light flux in the direction A is the smallest and a position in which a diameter of the total light flux in the direction B is the smallest.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 9 illustrates another example of the operation of the present invention.

FIG. 11 illustrates a configuration of the projection optical system according to Embodiment 1 of the present invention.

FIG. 12 illustrates data of the projection optical system according to Embodiment 1 of the present invention.

FIG. 13 illustrates data of an aspheric surface in the projection optical system according to Embodiment 1 of the present invention.

FIG. 14 illustrates data of a free-curved surface in the projection optical system according to Embodiment 1 of the present invention.

FIG. 15 shows an expression which represents the configuration of the free-curved surface.

FIG. 16 illustrates a focus distance of each lens in the projection optical system according to Embodiment 1.

FIG. 18 illustrates the lens data and position data of the projection optical system according to Embodiment 2 of the present invention.

FIG. 19 illustrates the data of an aspheric surface in the projection optical system according to Embodiment 2 of the present invention.

FIG. 20 illustrates the data of a free-curved surface of the projection optical system according to Embodiment 2 of the present invention.

FIG. 21 illustrates a focus distance of each lens in the projection optical system according to Embodiment 2 of the present invention.

FIG. 22 illustrates an aspect in which the total light flux is condensed according to Embodiment 1 of the present invention.

DETAILED DESCRIPTION OF THE PREFERRED EMBODIMENTS

Hereinafter, Embodiments of the present invention will be described.

First of all, a general configuration of a projector will be described.

Figure 1:
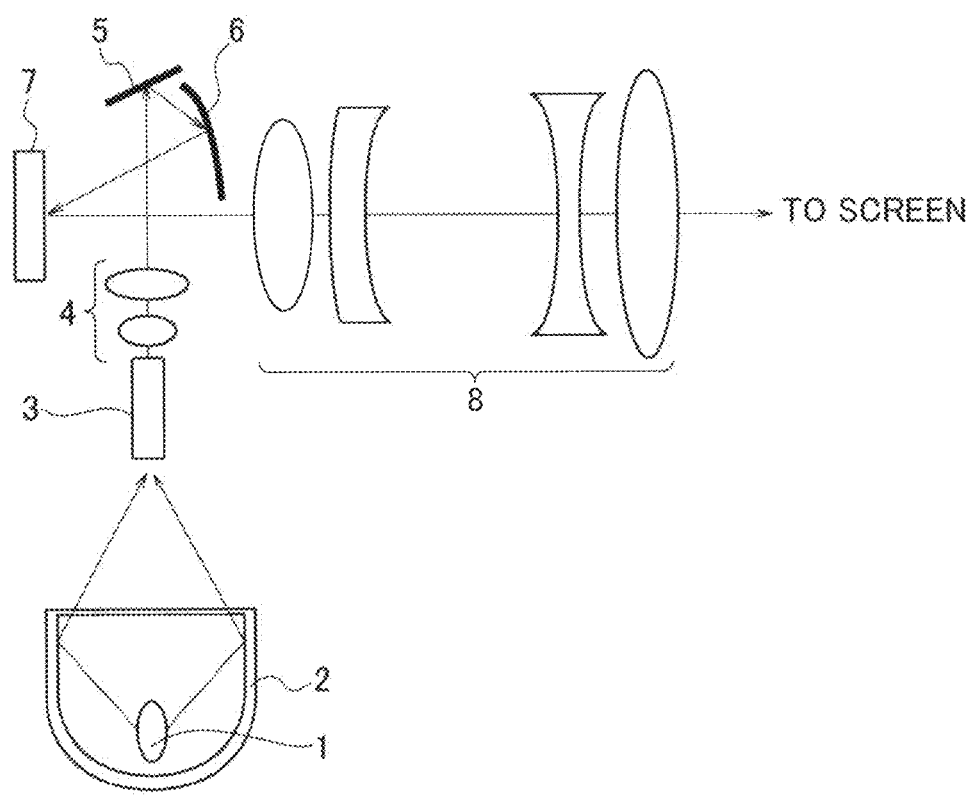
FIG. 1 illustrates an aspect in which light emitted from a light source travels toward a screen through a projection optical system.

FIG. 1 is provided in order to illustrate an aspect in which light emitted from a light source travels toward a screen through a projection optical system.

In FIG. 1, numeral 1 represents a lamp and numeral 2 represents a reflector. The lamp 1 and the reflector 2 configure a light source.

When the lamp 1 is turned on, light emitted from the lamp 1 and light reflected by the reflector 2 are condensed for illuminating an incident port of an integrator rod 3.

The integrator rod 3 is an optical element which includes a light-guiding path which is configured by assembled four mirror surfaces to have a tunnel configuration. The incident light beam which enters from the incident port of the integrator rod 3 is repeatedly reflected in the light-guiding path and travels toward an emission port.

Then, the light becomes a light flux having an even light-quantity distribution and is emitted from the emission port.

The emission port is used as a surface light source having an even optical intensity. An image of the surface light source is imaged on the image display surface of the image display element. Such an image-formation process is performed by an illumination optical system.

The illumination optical system is configured by a lens system 4, mirror 5, and curved mirror 6 in the example shown in FIG. 1.

The light which is emitted from the emission port of the integrator rod 3 transmits through the lens system 4. The optical path of the light is bent by the mirror 5, and bent again by the curved mirror 6.

Then, the light irradiates the image display surface of the image display element 7. The image display surface has an area for displaying the image which is enlarged and projected by the projection optical system.

An image is formed on the image display surface by the illumination optical system of the surface light source having even light intensity on the emission port of the integrator rod 3 through the integrated power of the lens system 4 and the curved mirror 6.

Thus, the image to be formed on the image display surface is the image of the above-described surface light source. Therefore, the image display surface is illuminated by illumination light having even light intensity.

The image display element is a so-called light bulb, and various types of light bulbs such as a liquid crystal panel are already known. DMD (Digital Micromirror Device) is assumed to be used as the image display element 7 in the example shown in FIG. 1.

The DMD includes a large number of micromirrors which are arranged two-dimensionally so that each of the micromirrors inclines independently.

The range of the inclination degree of each micromirror is about plus or minus 12 degrees.

Each micromirror configures one pixel of the image. By controlling the inclination degrees of the micromirrors corresponding to the pixels configuring the image to be displayed, the illumination light is reflected toward a predetermined direction.

Such a predetermined direction is a direction in which the reflecting light (hereinafter, referred to as image light) according to the image to be enlarged and projected travels toward the projection optical system 8.

The image light is imaged and projected as an enlarged projection image on a not-shown screen through the projection optical system 8.

Thereby, the image which is displayed on the image display surface of the image display element is enlarged and projected on the screen as the projection image by the projection optical system.

The above example is a general and already known example.

The DMD is used as an example of the image display element in the above description. It is required to illuminate the DMD by illuminating light herein because it has no function to emit light by itself.

However, for example, an image display element which includes two-dimensionally arranged photo diodes has a function to emit light independently. In such a case, the illumination by the illuminating light is not necessary.

An example to project a monochrome image has been described above with reference to FIG. 1. However, color images can be projected by various already known methods.

Figure 2:
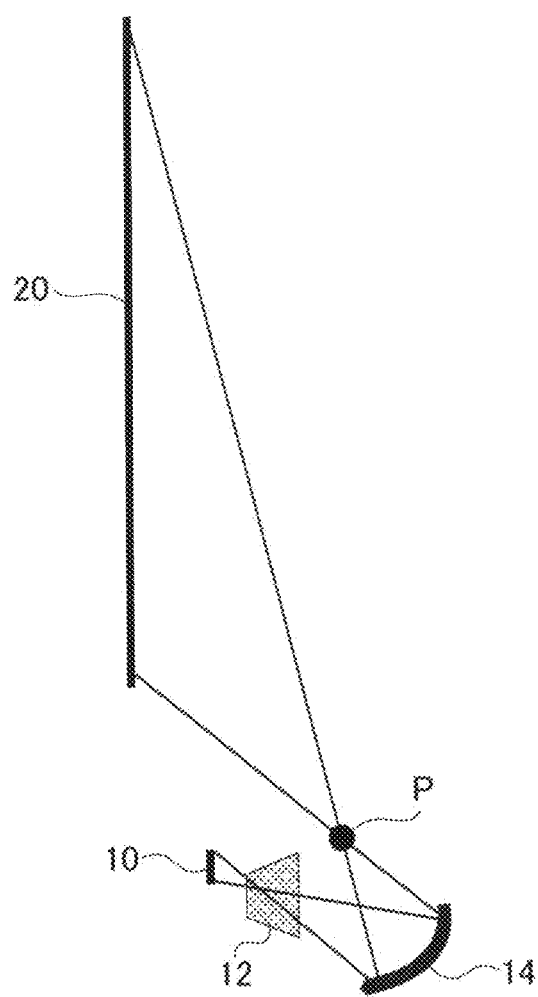
FIG. 2 illustrates a general image-formation process by a projection optical system in which a refracting optical system and a concave mirror are incorporated.

FIG. 2 is provided in order to explain a general image-forming process with use of the projection optical system in which a refracting optical system and a concave mirror are incorporated.

In the example, the projection optical system is configured by a refracting optical system 12 and a concave mirror 14.

The numeral 10 in FIG. 2 represents the image display element. Generally, the image-formation process is performed by using an oblique ray in the example in which the refracting projection system and the concave mirror are incorporated in the projection optical system.

Therefore, the image display surface of the image display element 10 is located above the refracting optical system 12 in FIG. 2, and the lower end portion of the image display surface is located in a position higher than that of the optical axis of the refracting optical system 12 in FIG. 2.

Image light from the image display element 10 enters into the refracting optical system 12 and is emitted from the refracting optical system 12. The light emitted from the refracting optical system 12 enters into and is reflected by the concave mirror 14, and is imaged on a screen 20.

Image light flux which is reflected by the concave mirror 14 and travels toward the screen 20 disperses and enters into the screen 20 after the diameter of the light flux is reduced once around the concave mirror 14.

In FIG. 2, the symbol P represents the position where the diameter of the image light flux is the smallest.

Figure 3:
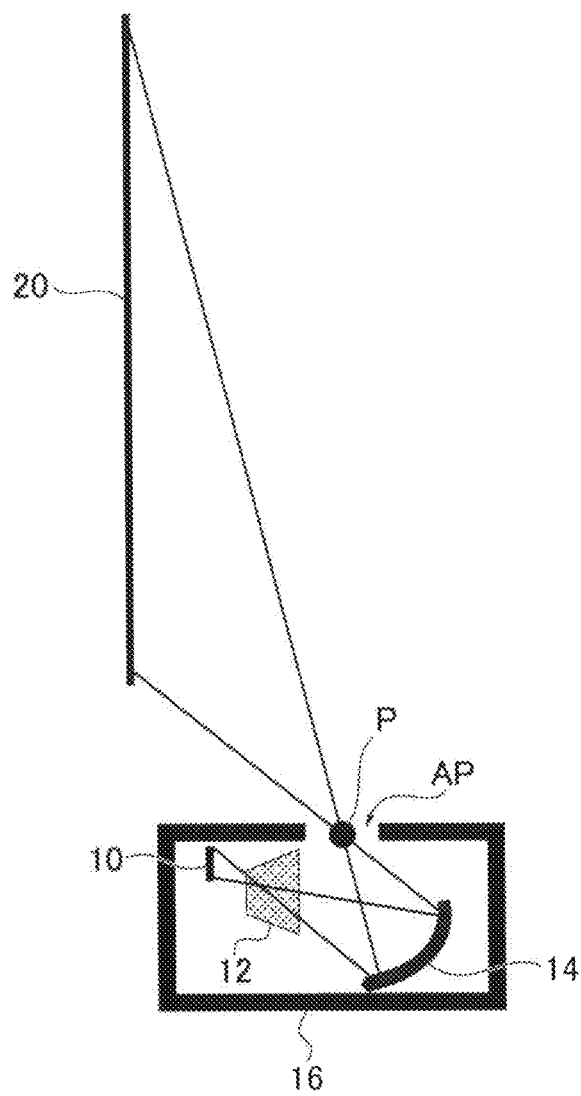
FIG. 3 illustrates an aspect in which projection optical systems 12 and 14 and an image display element 10 as shown in FIG. 2 are housed in a casing 16.

FIG. 3 illustrates an aspect in which the projection optical systems 12, 14 and the image display element 10 which are shown in FIG. 2 are housed in a casing 16.

The casing 16 has a light-blocking effect and includes an aperture AP. The image light flux which is reflected by the concave mirror 14 is emitted from the aperture AP.

The aperture AP is formed in the position P where the diameter of the image light flux reflected by the concave mirror 14 becomes the smallest. The image light flux can transmit through the aperture AP with the smallest diameter.

The casing 16 is represented as an example of a light-blocking member having an aperture.

As above, the general configuration of the projection optical system including the refracting optical system and the concave mirror, and the image projection apparatus using the projection optical system are described shortly.

Hereinafter, the ghost light which is generated in the case in which the refracting optical system includes a free-curved lens will be described.

Herein, to make the description simpler, the numerals and symbols in FIG. 2 and FIG. 3 are used in common in FIG. 4 to FIG. 22, as long as the numerals and symbols cannot be confused.

Figure 4:
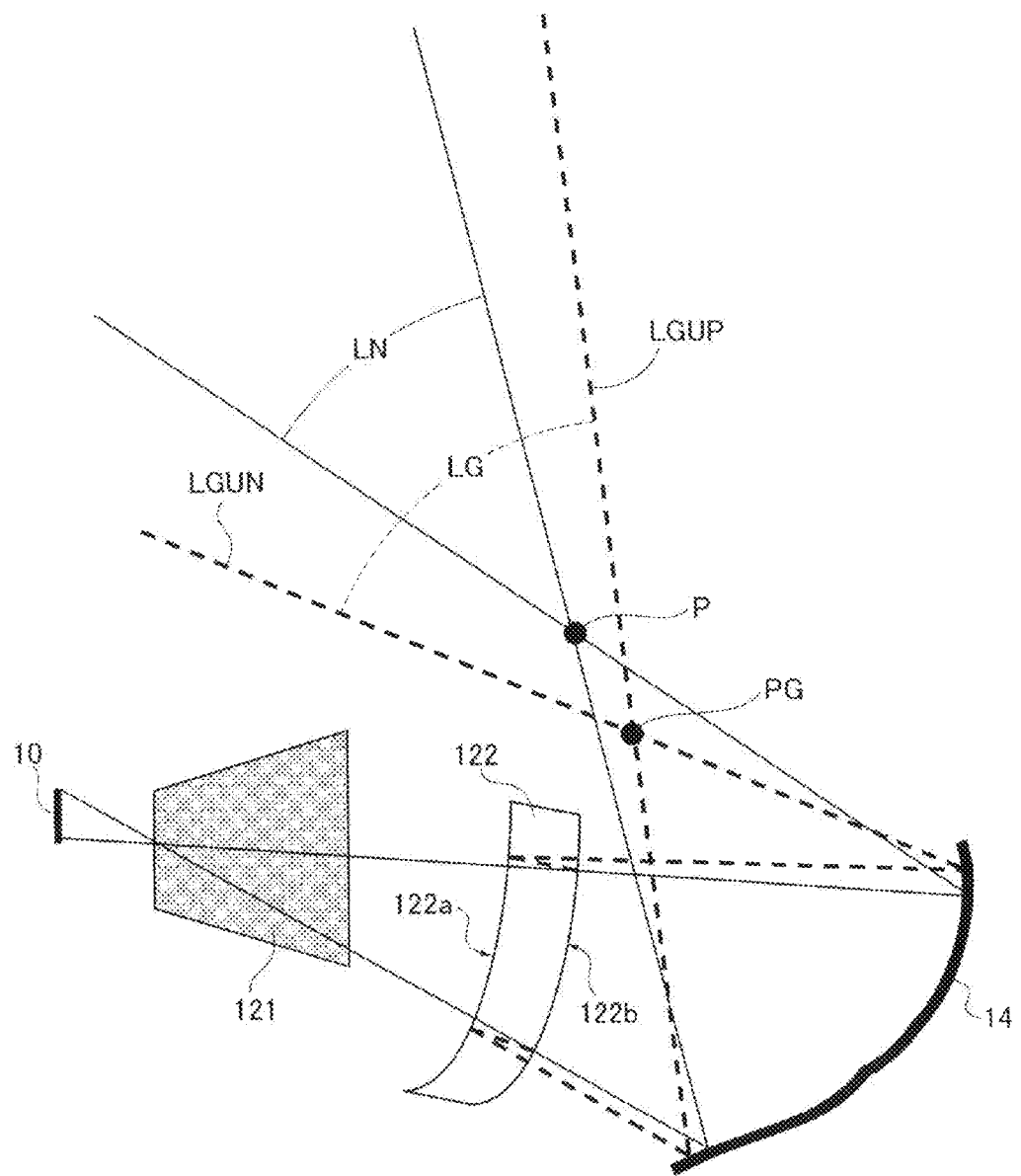
FIG. 4 illustrates an example of ghost light caused by a free-curved lens.

The refracting optical system in the projection optical system is configured by a coaxial lens system 121 and a free-curved lens 122 in the image projection apparatus shown in FIG. 4.

The coaxial lens system 121 is configured by a plurality of lenses having an optical axis in common.

The free-curved lens 122 has on at least one side thereof a free-curved surface.

In the present example, the free-curved lens 122 is disposed in between the coaxial lens system 121 and the concave mirror 14.

The image light from the image display element 10 enters into the coaxial lens system 121, and is emitted from the coaxial lens system 121. Then, the image light enters into the free-curved lens 122.

The light flux emitted from the free-curved lens 122 enters into and is reflected by the concave mirror 14, and is imaged as a projection image on a not-shown screen.

The symbol LN in FIG. 4 represents the image light flux which forms the projection image on the not-shown screen through the imaging function of the coaxial lens system 121, free-curved lens 122, and concave mirror 14.

The light beam which configures the image light flux LN is referred to as a regular light beam.

The symbol LG in FIG. 4 represents ghost light flux. The light beam which configures the ghost light flux is referred to as ghost light.

The ghost light is generated as follows.

As shown in FIG. 4, when the regular light beam emitted from the coaxial lens system 121 transmits through the free-curved lens 122, a part of the regular light beam is reflected on an emission surface 122b of the free-curved lens 122.

The light beam which is reflected on the emission surface 122b goes back to an incident surface 122a of the free-curved lens 122, and is reflected on the incident surface 122a. Then the light becomes ghost light and enters into the concave mirror 14.

The ghost light which is reflected on the concave mirror 14 configures the ghost light flux LG and irradiates the not-shown screen so as to overlap with the projection image.

The ghost light LG is also imaged as an image but the imaging position is apart from that of the regular light beam, so it cannot be visibly recognized as a ghost image.

However, such a ghost image is distinct in the peripheral part of the projection image which is imaged with use of the regular light beam.

In FIG. 4, the symbols LGUN and LGUP represent the ghost light which travels toward the peripheral part of the projection image (around the upper or lower end portion of the projection image in the figure).

In the above ghost light, the ghost light LGUN represents ghost light which travels toward the lower side of the screen, and the ghost light LGUP represents ghost light which travels toward the upper side of the screen.

The incident angle of the ghost light LGUN toward the screen is larger than that of the other ghost light. Therefore, a focus depth in the image-forming of the ghost light LGUN is relatively deep.

Accordingly, the ghost image is relatively distinct on the lower portion of the screen.

Because the incident angle of the ghost light LGUP toward the screen is large, the focus depth in the imaging of the ghost light LGUP is relatively shallow, so the ghost image is relatively indistinct.

In FIG. 4, the symbol P represents the position where the diameter of the image light flux LN is the smallest (hereinafter, referred to as position P).

The symbol PG represents the position where the diameter of the ghost light flux LG is the smallest (hereinafter, referred to as position PG).

Figure 5:
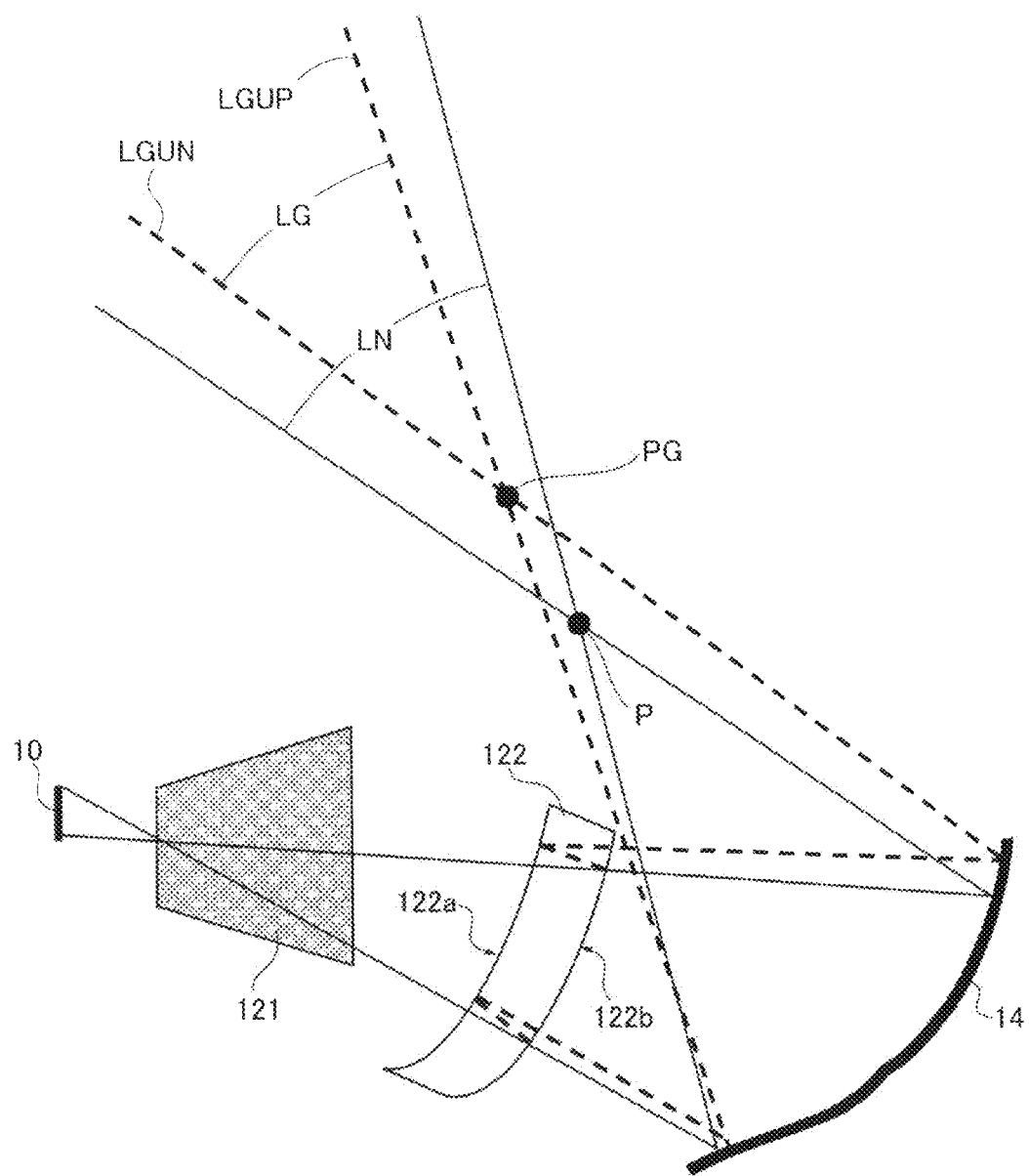
FIG. 5 illustrates another example of the ghost light caused by the free-curved lens.

The refracting optical system in the projection optical system in the image projection apparatus as shown in FIG. 5 is configured by the coaxial lens system 121 and free-curved lens 122.

The projection optical system in FIG. 5 is different from that in FIG. 4 in the detailed configuration of the lens or lens system; however, in order to simplify the description, the numerals and symbols in FIG. 4 are similarly used in FIG. 5.

The image light from the image display element 10 enters the coaxial lens system 121, and is emitted from the coaxial lens system 121. Then, the image light enters into the free-curved lens 122.

Similar to the example shown in FIG. 4, the image light flux LN of a regular light beam forms the projection image on the not-shown screen. The ghost light flux LG configured by the ghost light forms the ghost image.

Ghost light is regarded as a light beam which is reflected on the emission surface 122b of the free-curved lens 122, returns to the incident surface 122a, and is reflected on the incident surface 122a.

Similarly, in the above-described example, as for the incident angle of the ghost light towards the screen, the ghost light LGUN which enters the lower side of the projection image has a larger angle than that of the other ghost light.

Therefore, the focus depth in the imaging of the ghost light LGUN becomes relatively deep, so the ghost image is relatively distinct on the lower side of the screen.

The incident angle to the screen of the ghost light LGUP which enters the upper side of the projection image is large, and the focus depth in the image-forming is relatively shallow. Thus, the ghost image is relatively indistinct.

When comparing examples in FIG. 4 and FIG. 5, the position P has a longer distance from the concave mirror 14 than that of the position PG in FIG. 4, and the position PG has a longer distance from the concave mirror 14 than that of the position P in FIG. 5.

In addition, when comparing the diameter between the ghost light flux LG and the image light flux LN, the ghost light LG has a larger diameter than that of the image light flux LN on the screen side of the position P in the example shown in FIG. 4.

The ghost light flux LG has a larger diameter than that of the image light flux LN on the concave mirror 14 side of the position P in the example shown in FIG. 5.

As described above, it can be selectable by the design of the projection optical system to separate the position P and the position PG on the optical path of the image light flux LN and to dispose any one of the positions P and PG on the adjacent side to the concave mirror 14.

Figure 6:
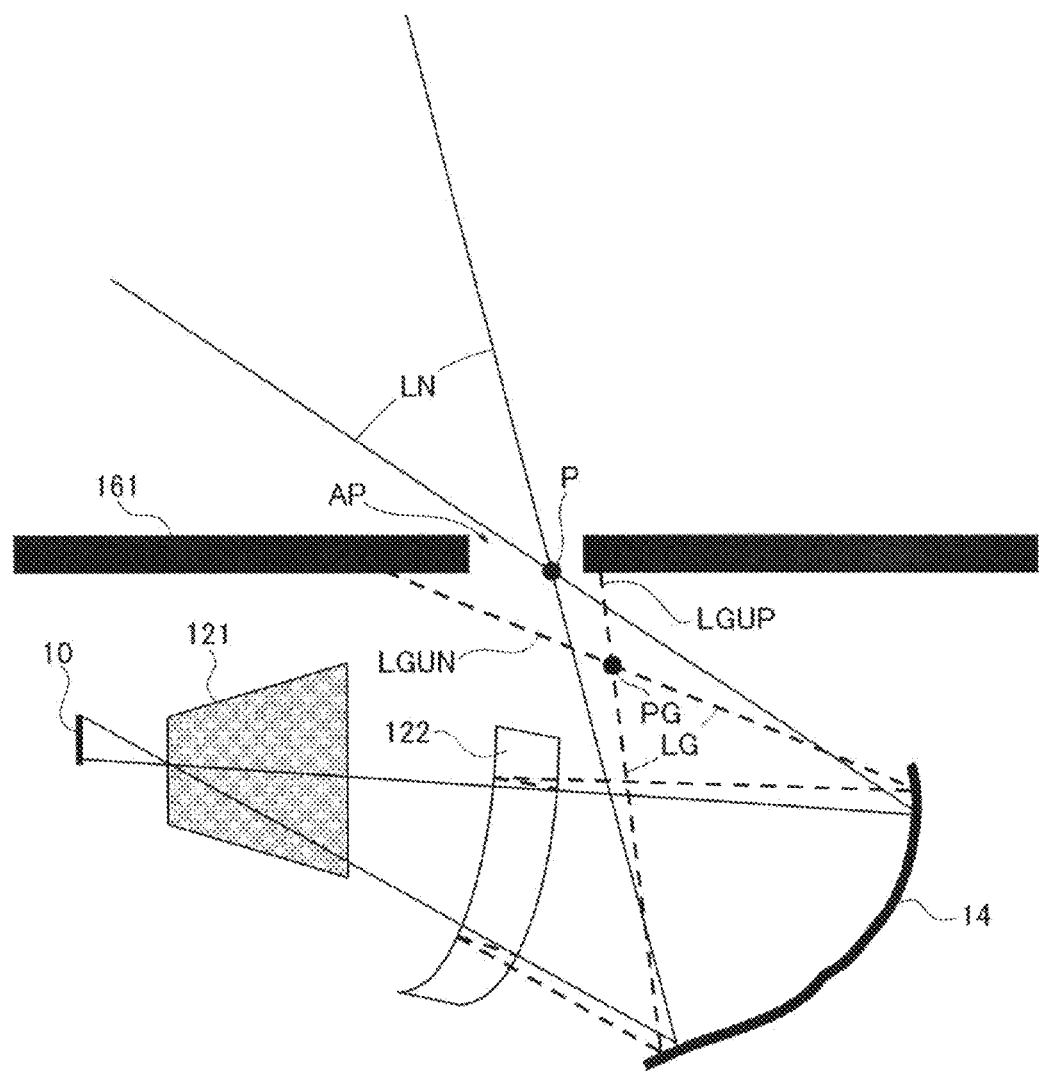
FIG. 6 illustrates an example in which the ghost light is blocked by a light-blocking member.

Therefore, when the positional relationship between the position P and the position PG is as indicated in FIG. 4, the ghost light LGUN and ghost light LGUP are blocked by a light-blocking member 161, as shown in FIG. 6.

The image light flux LN transmits through the aperture AP, and is not blocked by the light-blocking member 161.

Figure 7:
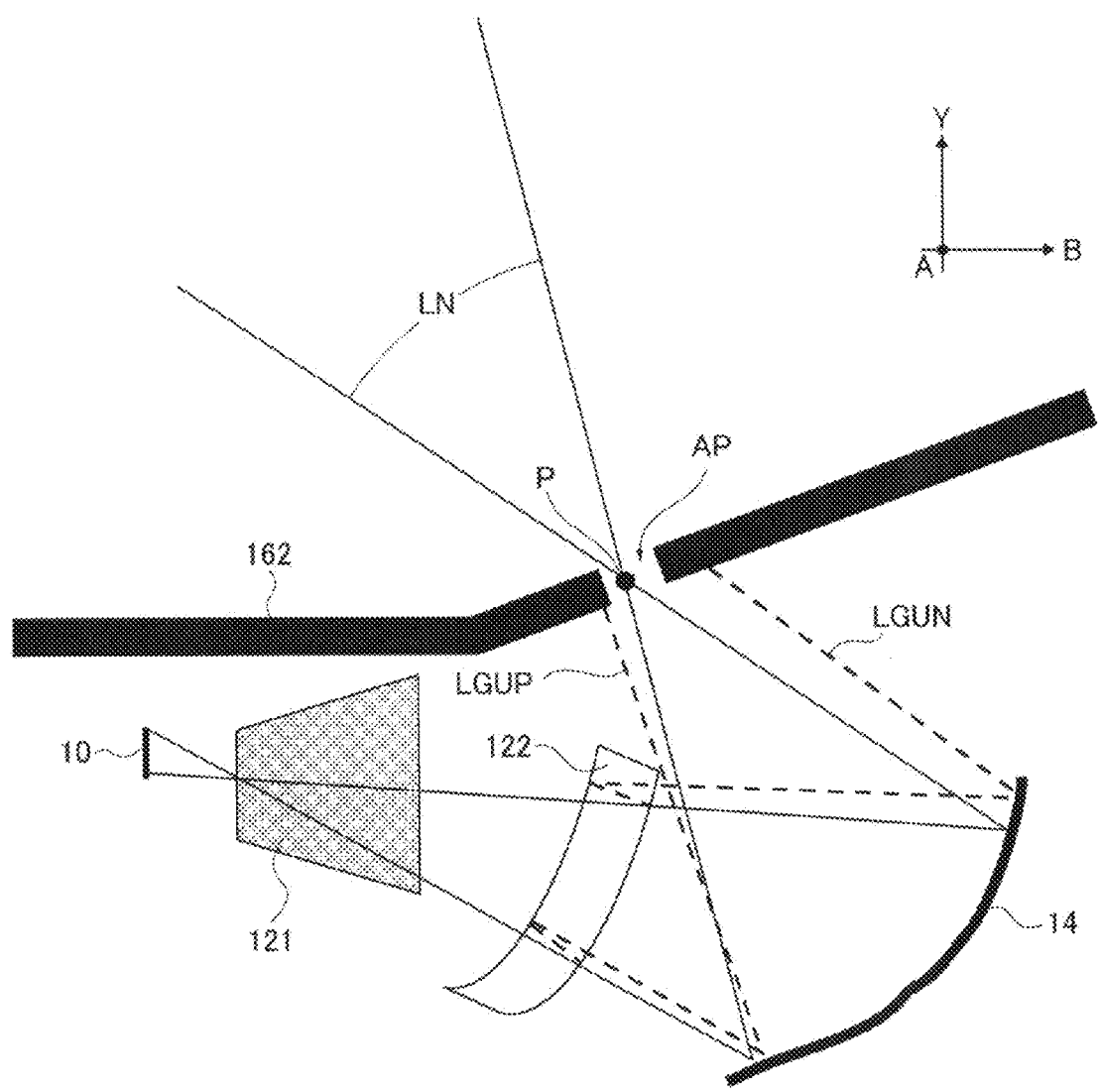
FIG. 7 illustrates another example in which the ghost light is blocked by the light-blocking member.

In addition, when the positional relationship between the position P and the position PG is as shown in FIG. 5, the ghost light LGUN and ghost light LGUP are blocked by a light-blocking member 162, as shown in FIG. 7.

The image light flux LN transmits through the aperture AP, and is not blocked by the light-blocking member 162.

As described above, the ghost image which is apt to be distinct on the screen is generated on the lower side of the projection image by the ghost light LGUN.

Therefore, when the ghost image formed by the ghost light LGUP is barely noticeable, it is also effective to configure the light-blocking members 161 and 162 to block only the ghost light LGUN.

Thus, the basic example to prevent the influence of the ghost image has been explained above.

Hereinafter, a supplemental description of the free-curved lens will be given.

As described above, the free-curved lens is affected significantly by assembly error.

The image projection apparatus according to the present invention copes with such a problem by configuring the free-curved lens to condense light weakly.

A lens described as follows is appropriate for such a lens system of the free-curved lens which condenses light weakly.

That is, the lens which is configured by a first surface into which total light flux from the image display element enters and a second surface from which the total light flux is emitted condenses light weakly.

The total light flux is a bunch of whole light beams which is introduced into the refracting optical system from the image display element, and is imaged on the screen. It corresponds to the above-described image light flux.

The ghost light flux is not included in the total light flux because it is not imaged on the screen.

In addition, it is appropriate to configure the first surface and the second surface of the lens to have a convex surface or a concave surface in the same direction.

The free-curved lens 122 as shown in FIG. 4 to FIG. 7 is also configured so that each of the first surface and the second surface has the convex surface in the same direction (the side of the concave mirror 14).

When the lens is configured as described above, the refractive power of the free-curved lens as a whole can be reduced even if the refractive power of the incident surface (first surface) or the emission surface (second surface) is strong and the refractive angle thereof is large.

Thereby, the sensitivity for assembly error can be suppressed.

The reason that the free-curved lens condenses light weakly can be summarized as follows.

In the thickness of the free-curved lens in the optical axis direction in the area where a light beam passes through, the thickest portion is represented as α, and the thinnest portion is represented as β.

Herein, the ratio: α/β satisfies the following condition:

$$\alpha/\beta < 1.5$$

The image projection apparatus of the present invention forms the projection image by using an oblique ray in the image-formation.

Therefore, the image display surface in the image display element is shifted closer to the screen side in relation to the refracting optical system. The lower end portion of the image display surface is above the optical axis of the refracting optical system.

As a result, the ghost image is distinct on the lower side of the projection image where the incident angle of the ghost light to the screen is large.

In light of the above, the area where a pixel light flux of the image display element transmits through the first and second surfaces of the free-curved lens is important. The pixel light flux is incorporated into the refracting optical system from the pixel closest to the optical axis.

Such an area is a free-curved surface. A curvature radius of a spherical surface having the smallest difference in relation to the free-curved surface in the area is defined as an approximate curvature radius.

That is, the curvature radius of a spherical surface which fits the most to an aspheric surface in the above-described area (that is, an area in which the difference in relation to the free-curved surface is the smallest) is represented as the approximate curvature radius.

The approximate curvature radius of the first surface is referred to as R1, and the approximate curvature radius of the second surface is referred to as R2. It is appropriate that R1 and R2 satisfy the following condition:

$$|R1| > |R2|$$

By satisfying the above condition, the sensitivity for assembly error where the ghost image is apt to occur on the lower side of the projection image can be suppressed without difficulty.

In addition, when a cross-sectional surface which is perpendicular to the long side of the image display element (long side of the image display surface) is referred to as a cross-sectional surface Y, the perpendicular direction to the optical axis on the cross-sectional surface Y is referred to as a direction Y, a cross-sectional surface which is perpendicular to the direction Y is referred to as a cross-sectional surface X, and the perpendicular direction to the optical axis in the cross-sectional surface X is referred to as a direction X, it is appropriate that the following condition be satisfied.

That is, in the free-curved lens, it is appropriate that an approximate curvature radius of the first surface in the direction Y: R1Y, an approximate curvature radius of the second surface in the direction Y: R2Y, an approximate curvature radius of the first surface in the direction X: R1X, and an approximate curvature radius of the second surface in the direction X: R2X, satisfy the following condition:

$$|R1Y|>|R2Y| \text{ or } |R1X|>|R2X|.$$

In view of the process to control the positional relationship between the free-curved lens and the optical axis of the coaxial lens system when the free-curved lens is assembled in the refracting optical system, it is effective for the free-curved lens to be assembled simply as long as one of the refractive power in the direction X or the refractive power in the direction Y is reduced.

When the sensitivity for assembly error is high in both of the direction X and direction Y, the free-curved lens should be assembled at a high accuracy in both of the direction X and direction Y in relation to the optical axis, in the controlling process.

However, if such a high-accuracy assembling is required only in the direction X or in the direction Y, the assembly operation becomes especially simple.

That is, the time for assembling can be shortened, and the quality difference between the image projection apparatuses upon high-volume production can be reduced.

Furthermore, when an approximate focus distance on the cross-sectional surface Y which is obtained from the refractive index of the material and the approximate curvature radiuses of the free-curved lens: R1Y and R2Y is represented as fY, and an approximate focus distance on the cross-sectional surface X which is obtained from the refractive index of the material and the approximate curvature radiuses: R1X and R2X is fX, it is appropriate that |fY| or |fX| be the largest in an absolute value of the focus distance of a lens or a cemented lens inside the refracting optical system.

Thereby, the refractive power in the direction X or direction Y on the above-described area of the free-curved lens can be the smallest in the refracting optical system, so the sensitivity for assembly error can be effectively reduced.

With reference to FIG. 4 to FIG. 7, ghost light and the process of removing the influence thereof have been described.

For a simpler description, the above description has been made assuming that the diameter of the total light flux becomes the smallest on the position P, and the diameter of ghost light flux becomes the smallest on the position PG.

This is because the projection optical system has an isotropic power.

Generally, in the projection optical system which includes the refracting optical system and the concave mirror, wherein the refracting optical system includes the free-curved lens, the power is not isotropic but differs in the horizontal or vertical direction of the imaged image.

This is derived from the fact that the refractive power of the free-curved lens differs in the direction X and the direction Y.

Hereinafter, in the cross-sectional surface of the total light flux behind the concave mirror, the long side direction of the projection image is referred to as a direction A, and the short side direction of the projection image is referred to as a direction B.

The cross-sectional surface of the light flux is a surface which virtually crosses the traveling direction of the light flux.

Generally, the projection optical system as described above has a power which is different between the direction A and direction B.

Thus, when the power differs in the direction A and direction B, the position where the diameter of the light flux becomes the smallest in the direction A and the position where the diameter of the light flux becomes the smallest in the direction B are disposed in the traveling direction of the light flux with a distance.

Figure 8:
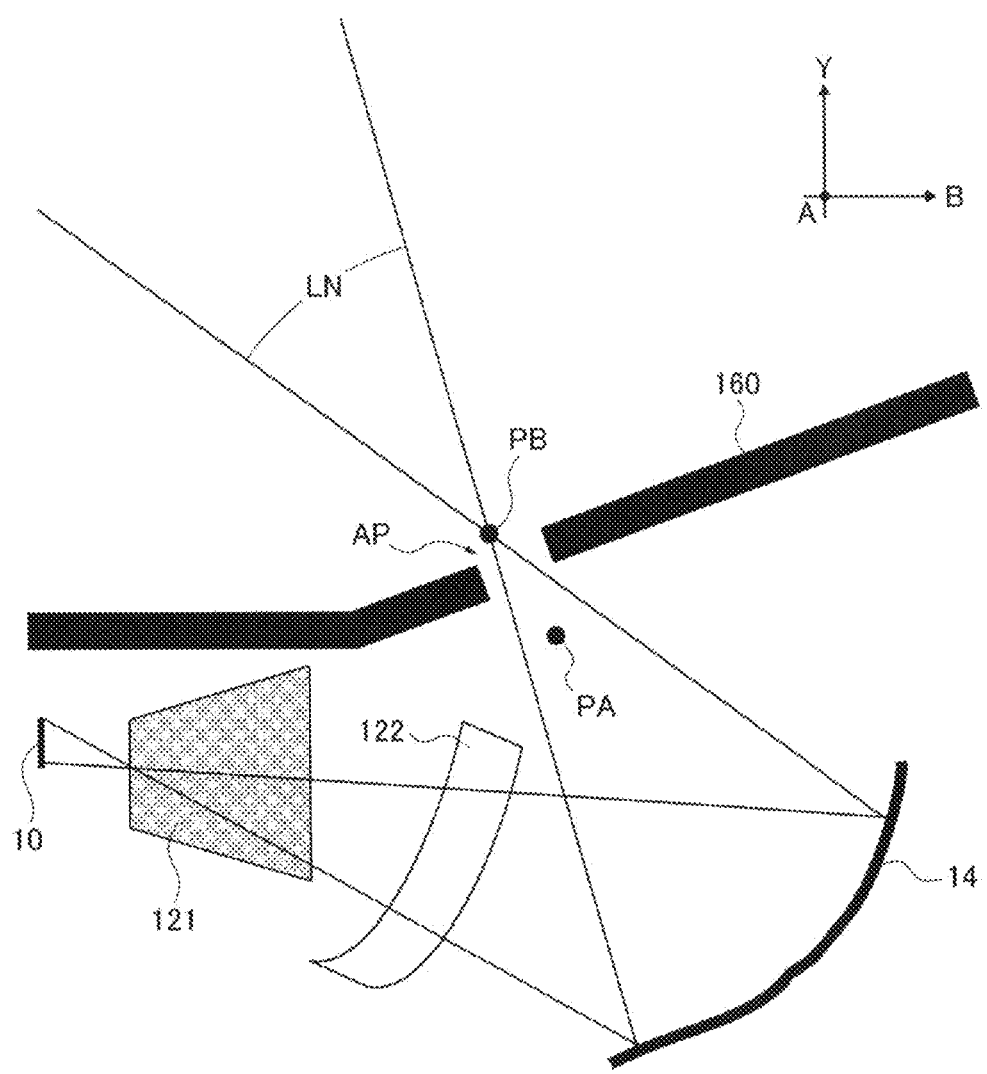
FIG. 8 illustrates an example of the operation of the present invention.

FIG. 8 illustrates the condition of the image light flux LN in the above example as viewed from the direction A.

As shown in the figure, the right and left direction of the figure is the direction B, the up and down direction is the direction Y, and the direction which is perpendicular to the direction B and the direction Y is the direction A.

A position PA which is indicated with the symbol PA in the figure represents the position where the image light flux LN is the smallest in diameter in the direction A, and a position PB which is indicated with the symbol PB in the figure represents the position where the image light flux LN is the smallest in diameter in the direction B.

FIG. 9 illustrates the condition which is shown in FIG. 8 as viewed from the direction B. The direction B in FIG. 9 represents a direction which is perpendicular to the direction Y and the direction A.

The symbol LNUP represents a part of the image light flux which travels toward the upper side of the screen, and the symbol LNUN represents a part of the image light flux which travels toward the lower side of the screen.

Therefore, when the position PA and the position PB are arranged separately in the traveling direction of the light flux, it is appropriate to arrange the light-blocking member 160 so that the aperture therein is arranged between the position PA and the position PB, as shown in FIG. 8 and FIG. 9.

However, the ghost image on the screen is more distinct in the direction having less refractive power in the direction X or the direction Y.

Accordingly, it is appropriate to arrange the aperture on the light condensing part side of the direction having less refractive power (the direction having larger fX or fY) in the direction X or the direction Y of the free-curved lens.

In the example shown in FIG. 8 and FIG. 9, the aperture is arranged on the position PB side assuming that the measurement relationship of the focus distance of the free-curved lens: fX and fY is fY>fX.

In the example shown in FIG. 7 and FIG. 8, the up and down direction of those figures is the direction of gravitational force.

The light-blocking member 160 and 162 in the above figures inclines from the surface which is perpendicular to the gravitational direction (right and left direction of the figures).

The light-blocking member inclines from the distant side to the adjacent side towards a not-shown screen (screen locates on the left side on the figure) in the gravitational direction.

When the light-blocking member 160 is inclined toward the opposite side to the above example, that is the inclination increases from the distant side to the adjacent side to the not-shown screen in the gravitational direction, the aperture of the light-blocking member is increased significantly.

It is appropriate that a diameter of the total light flux on the cross-sectional surface X or the cross-sectional surface Y: ZH, a width of the aperture of the light-blocking member on the cross-sectional surface X or the cross-sectional surface Y: KH, and the projection magnification ratio satisfy the following expression [1]. The detailed description regarding the above will be given with reference to the later-described Embodiments.

$$\infty(\text{projection magnification ratio})\times 0.3+ZH<KH \qquad [1]$$

The projection magnification ratio is defined as "the size of the screen/the size of the image display surface of the image display element".

EMBODIMENTS

Hereinafter, two embodiments of the projection optical system will be described in detail.

Embodiment 1

Figure 10B:
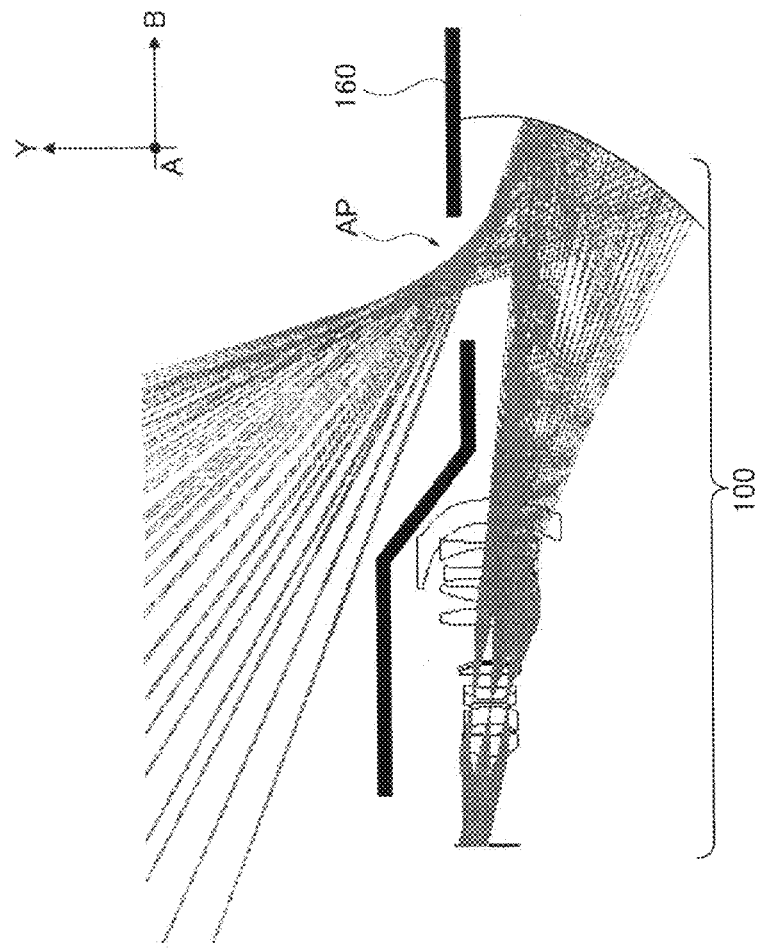
FIG. 10A and FIG. 10B illustrate a projection optical system according to Embodiment 1 of the present invention.
Figure 10A:
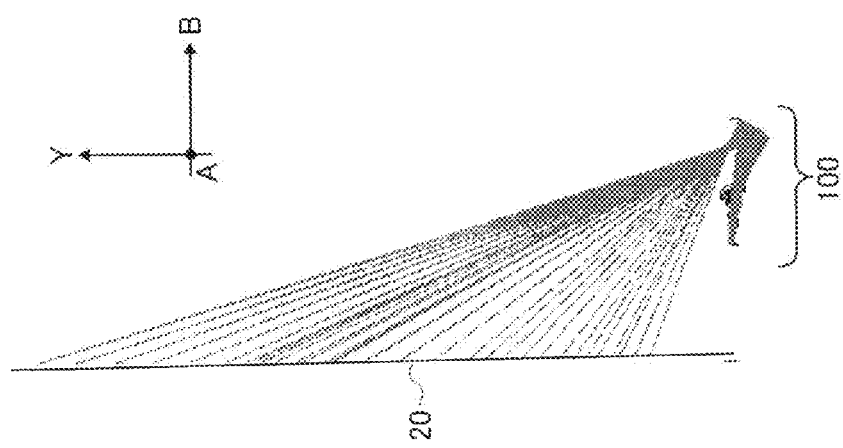

FIG. 10A and FIG. 10B illustrate the projection optical system according to Embodiment 1.

The numeral 100 in FIG. 10A and FIG. 10B represents the entire configuration of an image display element and a projection optical system.

The numeral 20 shown in FIG. 10A represents a screen. FIG. 10A illustrates a condition in which a total light flux forms an enlarged image on the screen 20.

An aperture AP in a light-blocking member which is shown with the numeral 160 in FIG. 10B is arranged in between a position where the total light flux is the smallest in diameter in the direction A (direction which is perpendicular to the direction Y and the direction B) and a position where the light flux is the smallest in diameter in the direction B.

The detailed configuration of the projection optical system of Embodiment 1 is shown in FIG. 11. In order to avoid confusion, the same symbols and numerals are used as in FIG. 2 and so on for each part in the figures.

The numeral 10 represents the image display element, the numeral 121 represents the coaxial lens system in the refracting optical system, the numeral 122 represents the free-curved lens, and the numeral 14 represents the concave mirror.

The symbol and numeral PX1 represents the pixel nearest to the optical axis of the coaxial lens system 121 on the image display surface of the image display element 10.

The light emitted from the pixel PX1 configures a light flux LN1. It is reflected by the concave mirror 14, and travels toward the lower end portion of the projection image on the screen.

The symbol and numeral PX2 represents the most-distant pixel from the optical axis of the coaxial lens system 121 on the image display surface in the image display element 10.

The light emitted from the pixel PX2 configures a light flux LN2. It is reflected by the concave mirror 14, and travels toward the upper end portion of the projection image on the screen.

The data according to Embodiment 1 is shown in FIG. 12. The refracting optical system includes twelve lenses.

The surface numbers 1 and 2 in FIG. 12 represent both side surfaces of the cover glass of the image display element (DMD is assumed to be used herein).

The first to eleventh lenses from the side of the image display element configure the coaxial lens system which has one optical axis in common, and these lenses include a spherical lens or an aspheric lens.

The twelfth lens from the side of the image display element is a free-curved lens.

The free-curved lens includes fX of −750 mm and fY of −677 mm. The configuration on the X direction side of the free-curved lens has a lower refractive power.

The values of the approximate curvature radius R1X, R2X, R1Y, and R2Y to define fX or fY are obtained from an area in the free-curved lens where the light flux LN1 shown in FIG. 11 transmits.

Herein, the values are as follows: R1X=−37.9 mm, R2X=−45.7 mm, R1Y=−30.9 mm, and R2Y=−37.6 mm.

The data of the aspheric surface lens which is included in the coaxial lens system in the projection optical system of Embodiment 1 is shown in FIG. 13. The aspheric surface is represented by a well-known expression which is shown in the lower side of FIG. 13.

Both surfaces of the free-curved lens and a reflecting surface of the concave mirror are configured to have the free-curved surfaces. The data of the free-curved surfaces is shown in FIG. 14. In accordance with the expression shown in FIG. 15, the free-curved surface is calculated.

The focus distance of the lens and the free-curved lens in Embodiment 1 is shown in FIG. 16.

L1 to L11 in the left side column represent the lenses which configure the coaxial lens system, and the free-curved surface L represents the free-curved lens.

Embodiment 2

Figure 17A:
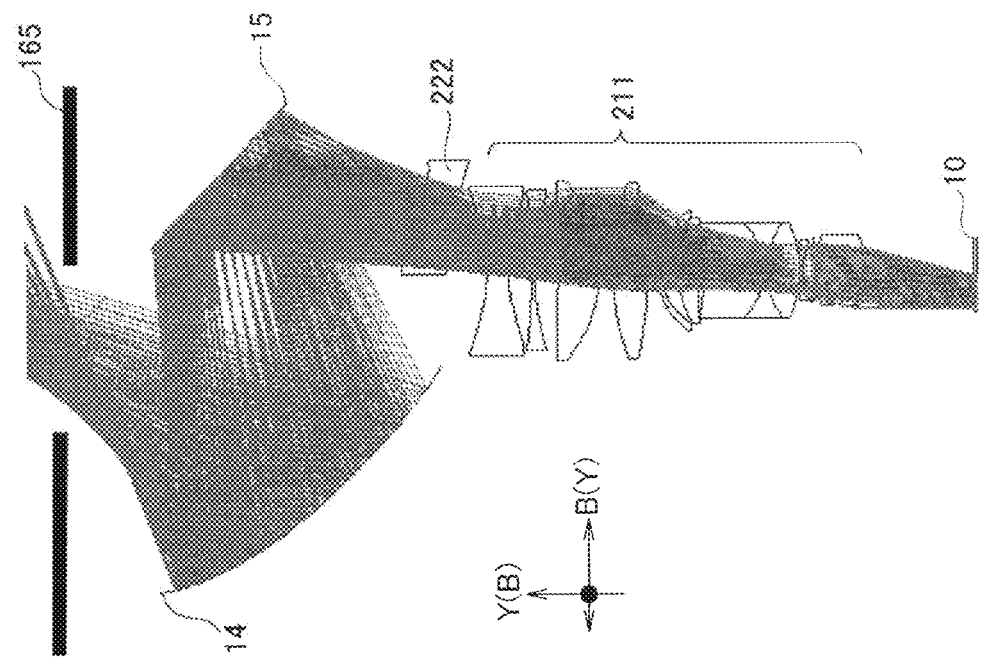
FIG. 17A and FIG. 17B illustrate a projection optical system according to Embodiment 2 of the present invention.
Figure 17B:
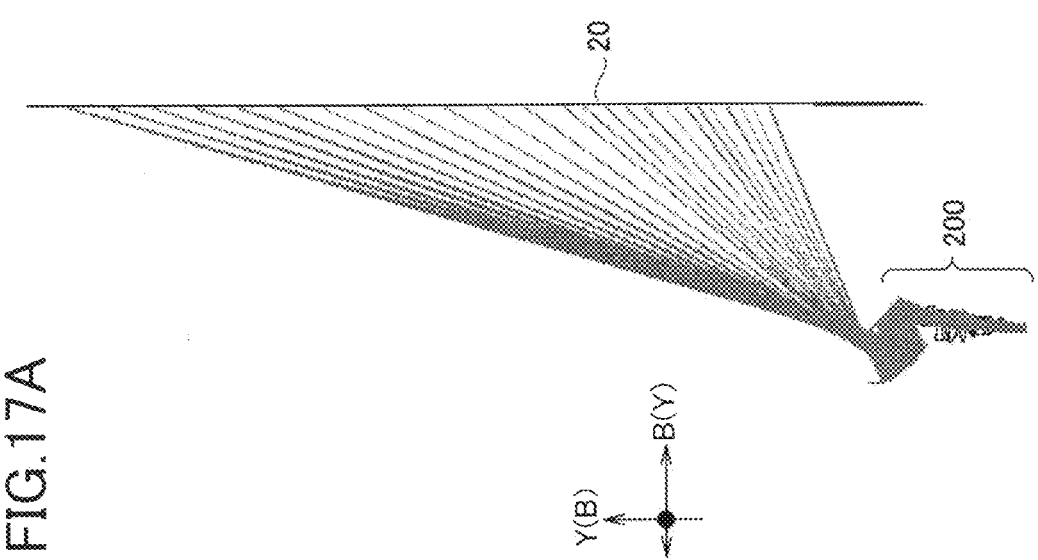

The optical configuration of Embodiment 2 in the present invention is shown in FIG. 17A and FIG. 17B following the example of FIGS. 10A and 10B. FIG. 17A shows an aspect of the image-formation process toward the screen. The numeral 200 represents the entire projection optical system including the image display elements.

As shown in FIG. 17B, the projection optical system which images the image light emitted from the image display element 10 on the screen includes the refracting optical system and a reflecting optical system.

The up and down direction in FIG. 17A is represented as a direction Y, the up and down direction in FIG. 17B is represented as a direction B, the right and left direction in FIG. 17A is represented as a direction B, and the right and left direction in FIG. 17B is represented as a direction Y.

The refracting optical system includes a coaxial lens system 211 and a free-curved lens 222, and the reflecting optical system includes a plane-surface mirror 15 and a concave mirror 14.

The plane-surface mirror 15 has a function to bend the total light flux towards the concave mirror 14.

The data of the projection optical system according to Embodiment 2 is shown in FIG. 18, following the example of FIG. 12. The lower part of the FIG. 18 shows the reflecting surface condition and the position of a standard point of the screen when an apex of the twenty-sixth surface in the lens data is provided as a standard point.

The data of the aspheric surface of the aspheric lens in the coaxial lens system is shown in FIG. 19.

Both surfaces of the free-curved lens and the reflecting surface of the concave mirror have the free-curved surfaces in the projection optical system, and the data of the free-curved surface is shown in FIG. 20, following the example of FIG. 14.

The focus distances of the lens and the free-curved lens in Embodiment 2 are shown in FIG. 21, following the example of FIG. 16.

L1 to L12 in the left-side column represent the lenses which configure the coaxial lens system, and the free-curved surface L represents the free-curved lens.

The free-curved lens has fX of 154 mm and fY of 142 mm, so the configuration in the direction X has a smaller refractive power.

Herein, the values are as follows: R1=−35.9 mm, R2x=−27.4 mm, R1y=−31.8 mm, and R2y=−24.8 mm.

The absolute value of fX is the largest in the refracting optical system as shown in FIG. 21. It can be said that the sensitivity for the assembly error in the X direction is low, so the degradation in the optical performance caused by the assembly error is small at least in the direction X.

FIG. 22 is a plot chart of a position coordinate of which a large number of light beams emitted from the image display element by using the projection optical system according to Embodiment 1 transmit through the aperture window. The coordinate is plotted with the direction A in the horizontal axis and the direction B in the vertical axis.

The aperture window is disposed virtually to be adjacent to the aperture of the light-blocking member.

The indication of "aperture window, 0 mm" represents the position where the image light flux becomes the smallest in diameter in the direction A.

When the position of the aperture window is moved 2 mm in the direction Y, the diameter of the image light flux becomes smaller in the direction B but it becomes larger in the direction A, as indicated in the figure as "aperture window, plus 2 mm to the direction Y".

When the position of the aperture window is moved 4 mm in the direction Y, the light flux becomes the smallest in diameter in the direction B but it becomes much larger in the direction A.

Accordingly, it can be understood that the light-blocking member includes the aperture window to be arranged appropriately in the position which is shown as "aperture window, 0 mm" in the figure. That is, it is appropriate to arrange the aperture window of the light-blocking member in the position where the image light flux becomes the smallest in diameter in the direction A.

This is because the measurement relationship between the focus distances: fX and fY of the free-curved lens 222 is such as fX>fY in the projection optical system according to Embodiment 1.

As described above, it is appropriate to arrange the aperture (especially, its surface on the concave mirror side) of the light-blocking member to be adjacent to the position where the diaphragm of the total light flux is the smallest in the direction A.

However, in the optical system according to Embodiment 1, the difference between the position where the diaphragm is the smallest in the direction A (aperture window, 0 mm) and the position where the diaphragm is the smallest in the direction B (aperture window, plus 4 mm to the direction Y) is only about 4 mm.

Therefore, when the aperture is arranged in between the above two positions, the influence caused by the ghost light can be avoided effectively.

In the projection optical system according to Embodiment 1, the size of the projection image which is enlarged on the screen is therefore: the diagonal dimension is 80 inch, and the diagonal dimension of the image display surface in the image display element is 0.65 inch.

Accordingly, a projection magnification ratio of the projection optical system in Embodiment 1 is approximately 123 times.

When applying the projection magnification (=123 times) and ZN on the position: "aperture window, 0 mm" in FIG. 22 to the above-described condition [1]:

$$\sqrt{(\text{projection magnification ratio})} \times 0.3 + ZH < (KH),$$

the following values can be obtained.

The direction $A$: $3.3+20=23.3$ mm

The direction $B$: $3.3+35=38.3$ mm

In light of the above, it can be said that it is appropriate to form the diameter of the aperture: KH to be a little larger than 23.3 mm×38.3 mm.

The significance of the expression [1] can be considered as follows.

As described above, the projection magnification ratio is "projection magnification ratio=the size of screen/the size of the image display element".

The projection optical system according to Embodiment 1 forms an intermediate image in between the refracting optical system and the concave mirror on the optical path of the total light flux. Therefore, the projection magnification ratio can be represented as follows.

Projection magnification ratio=the size of the screen/ the size of the intermediate image×the size of the intermediate image/the size of image display element.

That is, the square root of the projection magnification ratio can be an indication of the size ratio between the screen and the intermediate image.

For example, when the projection magnification ratio is 100, the size of the screen/the size of the intermediate image can be 5 or 10; however the approximate value can be understood.

The value in which the diameter of the total light flux is added to the value obtained by multiplying the above value (ratio) by 0.3 is the minimum value of the size of the aperture window.

For example, as is obvious from FIG. 11, the size of the intermediate image is approximately equal to the diameter of the light beam on the concave mirror 14, and the size of the screen is the area which is irradiated by the light beam on the screen 20 shown in FIG. 10A.

The increase in the √(projection magnification ratio) which represents the indication of the size ratio represents the increase in the projection magnification ratio, that is, it means that the area which is irradiated by the light beam in the screen expands.

It also means that the angle of the light beam toward the screen 20 from the concave mirror 14 increases.

When describing the above with reference to FIG. 10A, the light beam toward the lower side of the screen 20 travels toward the lower side of the screen furthermore, and the light beam towards the upper side travels toward the upper side furthermore.

That is, the angle of the light beam which travels toward the screen 20 from the concave mirror 14 increases.

Therefore, if the size of the aperture is not set so as to be larger than those in the case in which the projection magnification ratio is smaller, the light beam which should travel toward the screen is blocked by the light-blocking member by a slight assembly error of the members.

Therefore, the √(projection magnification ratio) represents the indication of the size ratio between the projection image and the intermediate image. In other words, it may be the indication of the angle of the light beam which is emitted from the concave mirror 14 towards the screen.

Accordingly, the expression [1] can be considered as the effective condition which minimizes the size of the aperture so as to minimize the influence caused by the ghost light.

The value 0.3 in the condition [1] is determined as a result of reviewing assembly accuracy of the members of the image projection apparatus and the angle of the light beam which is emitted from the concave mirror toward the screen. Herein, when the projection magnification ratio is 100 times, the total light flux is blocked unless it has room of about 3 mm.

As shown in FIG. 16, the free-curved lens of the projection optical system according to Embodiment 1 has the largest absolute value of the focus distance in both fX and fY inside the refracting optical system.

Therefore, it is obvious that it has a high sensitivity for assembly error.

Regarding the thickness of the free-curved lens in the direction of the optical axis in the area through which the light beam transmits, the ratio of the thickness of the thickest portion α and the thinnest portion β, α/β is 1.3 in Embodiment 1, and 1.2 in Embodiment 2. Thus it does not exceed 1.5.

According to Embodiments of the present invention, an image projection apparatus which is capable of dealing with ghost light caused from a free-curved lens can be achieved.

Although the embodiments of the present invention have been described above, the present invention is not limited thereto. It should be appreciated that variations may be made in the embodiments described by persons skilled in the art without departing from the scope of the present invention.

What is claimed is:

1. An image projection apparatus which enlarges and projects an image displayed on an image display element as a projection image on a screen, comprising:
    the image display element which displays an image to be enlarged and projected;
    a refracting optical system which includes a free-curved lens;
    a reflecting optical system which includes at least one concave mirror; and
    a light-blocking member which includes an aperture, wherein
    for a sectional surface of a total light flux after the concave mirror, the total light flux being a plurality of whole light beams introduced into the refracting optical system from the image display element and imaged on the screen, wherein a direction corresponding to a long side direction of the projection image is a direction A and a direction corresponding to a short side direction of the projection image is a direction B,
    the light-blocking member is disposed so that the aperture is located in between (1) a first position at which a width of the sectional surface in the direction A is smallest, and (2) a second position at which a width of the sectional surface in the direction B is smallest.

2. The image projection apparatus according to claim 1, wherein
    the free-curved lens includes a first surface into which the total light flux from the image display element enters and a second surface from which the total light flux is emitted, and
    the first surface and the second surface in the lens include a convex surface or a concave surface in a same direction.

3. The image projection apparatus according to claim 1, wherein
    a ratio between a thickest portion α and a thinnest portion β in a thickness of the free-curved lens in an optical-axis direction in an area of the free-curved lens through which the light beam passes, that is α/β, satisfies the following condition:

$\alpha/\beta < 1.5$.

4. The image projection apparatus according to claim 1, wherein
    the refracting optical system includes a plurality of lenses having an optical axis in common;
    an image display surface of the image display element is apart from the optical axis of the refracting optical system toward a predetermined direction;
    in an area in which a pixel light flux, which is introduced into the refracting optical system from the pixel closest to the optical axis in the pixels of the image display element transmits through a first surface and a second surface of the free-curved lens, when a curvature of a spherical shape in the area which has the smallest difference in relation to a free-curved surface is an approximate curvature radius, the approximate curvature radius of the first surface R1 and the approximate curvature radius of the second surface R2 satisfy a condition:

$|R1| > |R2|$.

5. The image projection apparatus according to claim 4, wherein
    when a sectional surface which is perpendicular to a long side of the image display element is a sectional surface Y, a direction which is perpendicular to the optical axis on the sectional surface Y is a direction Y, a sectional surface which is perpendicular to the direction Y is a sectional surface X, and a direction which is perpendicular to the optical axis on the sectional surface X is a direction X, an approximate curvature radius R1Y of the first surface in the direction Y, an approximate curvature radius R2Y of the second surface in the direction Y, an approximate curvature radius R1X of the first surface in the direction X, and an approximate curvature radius R2X of the second surface in the direction X, in the free-curved lens, satisfy a condition:

$|R1Y| > |R2Y|$ or $|R1X| > |R2X|$.

6. The image projection apparatus according to claim 1, wherein
    when a surface into which the total light flux from the image display element enters is a first surface, a surface from which the total light flux emits is a second surface, a sectional surface that is perpendicular to a long side of the image display element is a sectional surface Y, a direction that is perpendicular to the optical axis on the sectional surface Y is a direction Y, a sectional surface that is perpendicular to the direction Y is a sectional surface X, and a direction that is perpendicular to the optical axis on the sectional surface X is a direction X, when an approximate curvature radius of the first surface in the direction Y is R1Y, an approximate curvature radius of the second surface in the direction Y is R2Y, an approximate curvature radius of the first surface in the direction X is R1X, and an approximate curvature radius of the second surface in the direction X is R2X, and when an approximate focus distance on the sectional surface Y that is obtained by a refractive index of a material of the free-curved lens and the approximate curvature radiuses R1Y and R2Y is fY, and an approximate focus distance on the sectional surface X that is obtained by the refractive index and the approximate curvature radiuses R1X and R2X is fX,

|fY| or |fX| is maximized within an absolute value of a focus distance of a lens or a cemented lens inside the refracting optical system.

7. The image projection apparatus according to claim 1, wherein the light-blocking member inclines in relation to a surface that is perpendicular to a gravitational direction; and the light-blocking member inclines from a distant side of the screen surface to an adjacent side of the screen surface, in the gravitational direction.

8. The image projection apparatus according to claim 1, wherein the light-blocking member is disposed so that the aperture is located in between the first position in which the width of the sectional surface becomes the smallest in the direction A and the second position in which the width of the sectional surface becomes the smallest in the direction B;

when a surface into which the total light flux from the image display element enters is a first surface, and a surface from which the total light flux emits is a second surface, a sectional surface that is perpendicular to the long side of the image display element is a sectional surface Y, a direction that is perpendicular to the optical axis on the sectional surface Y is a direction Y, a sectional surface that is perpendicular to the direction Y is the sectional surface X, and a direction that is perpendicular to the optical axis on the sectional surface X is a direction X, in the free-curved lens;

when an approximate curvature radius of the first surface in the direction Y is R1Y, an approximate curvature radius of the second surface in the direction Y is R2Y, an approximate curvature radius of the first surface in the direction X is R1X, and an approximate curvature radius of the second surface in the direction X is R2X, in the free-curved lens; and when an approximate focus distance on the sectional surface Y that is obtained by a refractive index of a material of the free-curved lens and the approximate curvature radiuses R1Y and R2Y is fY, and an approximate focus distance on the sectional surface X that is obtained by the refractive index and the approximate curvature radiuses R1X and R2X is fX;

the light-blocking member is disposed on a side of a position in which the total light flux becomes the smallest in the direction A when fX>fY, and is disposed on a side of a position in which the total light flux becomes the smallest in the direction B when fX<fY.

9. The image projection apparatus according to claim 1, wherein when a sectional surface that is perpendicular to a long side of the image display element is a sectional surface Y, a direction that is perpendicular to the optical axis on the sectional surface Y is a direction Y, a sectional surface that is perpendicular to the direction Y is a sectional surface X, and a direction that is perpendicular to the optical axis on the sectional surface X is a direction X;

a width ZH of the total light flux on the sectional surface X or the sectional surface Y, an aperture window width KH of the aperture in the light-blocking member on the sectional surface X or the sectional surface Y, and a projection magnification that is defined by a screen size divided by a size of an image display surface of the image display element satisfy the following condition (1) on the sectional surface X or the sectional surface Y:

$$\sqrt{(\text{projection magnification})} \times 0.3 + ZH < KH. \quad (1)$$

10. The image projection apparatus according to claim 1, wherein the light-blocking member blocks an unnecessary light beam that is not employed in image formation in the light beams reflected by the at least one concave mirror.

11. The image projection apparatus of claim 1, wherein a refractive power of the free-curved lens differs in a direction X and a direction Y, wherein when a sectional surface which is perpendicular to a long side of the image display element is the sectional surface Y, a direction which is perpendicular to the optical axis on the sectional surface Y is the direction Y, a sectional surface which is perpendicular to the direction Y is a sectional surface X, and a direction which is perpendicular to the optical axis on the sectional surface X is the direction X.

* * * * *